(12) United States Patent
Suzuki

(10) Patent No.: US 9,291,464 B2
(45) Date of Patent: Mar. 22, 2016

(54) INFORMATION PROCESSING SYSTEM

(71) Applicant: DENSO CORPORATION, Kariya, Aichi-pref. (JP)

(72) Inventor: Takamitsu Suzuki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/389,189

(22) PCT Filed: Mar. 20, 2013

(86) PCT No.: PCT/JP2013/001891
§ 371 (c)(1),
(2) Date: Sep. 29, 2014

(87) PCT Pub. No.: WO2013/145646
PCT Pub. Date: Oct. 3, 2013

(65) Prior Publication Data
US 2015/0094954 A1 Apr. 2, 2015

(30) Foreign Application Priority Data
Mar. 30, 2012 (JP) ................. 2012-081603

(51) Int. Cl.
*G01C 21/32* (2006.01)
*G09B 29/00* (2006.01)
(Continued)

(52) U.S. Cl.
CPC *G01C 21/32* (2013.01); *G06F 3/06* (2013.01); *G06F 12/00* (2013.01); *G06F 13/00* (2013.01); *G09B 29/003* (2013.01); *G09B 29/106* (2013.01)

(58) Field of Classification Search
CPC ...... G01C 21/32; G01C 21/26; G09B 29/106; G09B 29/003; G06F 12/00; G06F 13/00; G06F 3/06

USPC .................................. 701/532, 411
See application file for complete search history.

(56) References Cited

U.S. PATENT DOCUMENTS 5,285,391 A * 2/1994 Smith et al. .................. 701/533
8,396,660 B2 * 3/2013 Takahata et al. ............. 701/450
(Continued)

FOREIGN PATENT DOCUMENTS

JP H02240680 A 9/1990
JP H11344351 A 12/1999
(Continued)

OTHER PUBLICATIONS

International Search Report and Written Opinion (in Japanese with English Translation) for PCT/JP2013/001891, mailed Jun. 25, 2013; ISA/JP.

Primary Examiner — Rodney Butler
Assistant Examiner — Brian P Sweeney
(74) Attorney, Agent, or Firm — Harness, Dickey & Pierce, P.L.C.

(57) ABSTRACT

A navigation apparatus includes hierarchically road map data having third-, second-, and first-layer data respectively representing a high, intermediate, and low road rank. The layer data are contiguously disposed in a storage portion in the order of the road ranks. The first- and second-layer data include area data about individual zones into which a region corresponding to the third-layer data is divided. According to a read request designating a bunch of area data, a cached portion of the designated bunch of area data is obtained from a cache area. The remaining portion is obtained from the storage portion such that an address range of the storage portion from the start point to the end point of the remaining portion is collectively read while area data not designated by the read request but positioned between the remaining portion are additionally read.

15 Claims, 16 Drawing Sheets

(51) Int. Cl.
  *G06F 3/06*  (2006.01)
  *G06F 12/00* (2006.01)
  *G06F 13/00* (2006.01)
  *G09B 29/10* (2006.01)

(56) References Cited

U.S. PATENT DOCUMENTS

2011/0191020 A1  8/2011  Matsunaga

2012/0203458 A1  8/2012  Fujimoto

FOREIGN PATENT DOCUMENTS

| | | |
|---|---|---|
| JP | 2002324069 A | 11/2002 |
| JP | 2003315051 A | 11/2003 |
| JP | 2011158639 A | 8/2011 |
| JP | 2012163908 A | 8/2012 |
| JP | 2012163909 A | 8/2012 |

* cited by examiner

INFORMATION PROCESSING SYSTEM

CROSS REFERENCE TO RELATED APPLICATIONS

This application is a U.S. National Phase Application under 35 U.S.C. 371 of International Application No. PCT/JP2013/001891 filed on Mar. 20, 2013 and published in Japanese as WO 2013/145646 A1 on Oct. 3, 2013. This application is based on and claims the benefit of priority from Japanese Patent Application No. 2012-081603 filed on Mar. 30, 2012. The entire disclosures of all of the above applications are incorporated herein by reference.

TECHNICAL FIELD

The present disclosure relates to an information processing system that performs a process by using map data.

BACKGROUND ART

Car navigation apparatuses, smartphones, and other electronic instruments that present a road map to a user, search for a route to a destination, and guide the user along the road to the destination are known as an information processing system that performs a process by using map data. Further, it is known that some of these electronic instruments update locally stored map data in accordance with data received from a distribution center.

Moreover, known map data has a hierarchical structure that includes a plurality of layers of data. It is known that the data in the lowest layer includes detailed road network information such as information about superhighways, national roads, major local roads, prefectural roads, and minor streets, and that the data in a high layer includes information about major road networks only (refer to Patent Literature 1).

PRIOR ART LITERATURES

Patent Literature

[Patent Literature 1] JP-2003-315051-A

SUMMARY OF INVENTION

Meanwhile, map data having a plurality of layers of data that redundantly includes the above-mentioned road network information about superhighways, national roads, and the like ensures that detailed road information and major road information may be read with ease. However, when the map data is to be updated in accordance, for instance, with newly constructed roads, a complicated process needs to be performed. More specifically, when roads described in a plurality of layers are changed, it is necessary to correct the data in each layer.

Further, when differential map data for updating the map data is to be supplied from the distribution center to a user's electronic instrument, communications traffic may be reduced by allowing the distribution center to transmit only the differential map data for the lowest-layer data having detailed road network information to the user's electronic instrument. In such an instance, however, it is necessary to determine road network changes from the differential map data for the lowest-layer data and convert the road network changes to information for updating the high-layer data. This will adversely affect an update-related processing load and processing time.

It is an object of the present disclosure to provide a technology that makes it possible to rapidly read relevant information from map data without allowing road network information to be written redundantly in a plurality of layers.

In accomplishing the above object, according to an aspect of the present disclosure, there is provided an information processing system including a map storage unit, a read control section, and a temporary memory. The map storage unit stores road map data that hierarchically describes a road network in a particular region in accordance with road ranking. The read control section reads data from a map data storage unit. The temporary memory temporarily stores the data read from the map storage unit.

The road map data stored in the map storage unit includes layer data that is classified by road rank to represent a road network of a particular road rank in a particular region. Thus, the stored road map data hierarchically represents a road network in a particular region in accordance with the road ranks. As is well known, the road ranks may be defined in such a manner that superhighways and other roads appropriate for long-distance traveling are ranked high.

Each set of layer data includes one or more area data (one or more sets of area data). At least layer data of a non-highest road rank, which is a road rank other than the highest road rank, includes area data about individual zones into which the particular region is divided. The area data represents a road network of a specific road rank in a specific zone.

The map data storage unit uses contiguous address spaces to store a bunch of area data that are arranged by road rank. For example, a bunch of area data are arranged by road rank in accordance with the geographical dispositions of the zones.

Meanwhile, the temporary memory is configured as a storage unit that is accessible at a higher speed than the map storage unit and used to temporarily store a bunch of area data read from the map storage unit.

The read control section accesses either one of the map storage unit and the temporary memory, reads individual area data requested (designated) by a read request, and supplies the read area data to a requester. More specifically, a bunch of area data stored in the temporary memory, which are included in the bunch of area data requested by the read request, are read from the temporary memory, and a bunch of area data not stored in the temporary memory are read from the map storage unit.

Particularly when a bunch of area data not stored in the temporary memory are to be read from the map storage unit in compliance with a read request, the bunch of area data are collectively read on an individual group basis or on the basis of a plurality of groups, including area data that is not requested by the read request and is positioned between the above-mentioned bunch of area data within an address space. The bunch of area data read from the map storage unit are then temporarily stored in the temporary memory.

The information processing system configured as described above hierarchically represents road map data in accordance with the road ranks. This makes it possible to avoid a road network from being written redundantly in a plurality of layers and ensure that a new road network is efficiently reflected in the road map data. Meanwhile, according to a map data structure employed in the above-described information processing system, the relationship between layer data is not the relationship between map data that represents the details of a road network as is the case with conventional map data and map data about major roads that is without some road rank information. Therefore, when, for instance, a detailed map is to be presented to a user, it is necessary to read a plurality of layer data. Thus, the number of reads tends to increase.

As such being the case, the information processing system according to an optional aspect of the present disclosure arranges area data as described above and collectively reads a plurality of area data (a plurality of sets of area data) that are requested by a read request but are positioned at separate locations within an address space, including area data that is not requested by the read request but is positioned between the requested area data. The use of this read method makes it possible to decrease the number of reads of area data from the map data storage unit and reduce a read-related processing load and processing time.

Further, the above-described information processing system additionally reads the area data not requested by the read request. However, the user often uses road maps for the purpose of confirming secondary roads and verifying a route to a destination during traveling. Therefore, it is highly probable that the area data about nearby zones relevant to the area data requested by the read request may become necessary in accordance with the user's traveling and with the progress of route searching and guidance processing.

Hence, even if the area data not requested by the read request is read together with the area data requested by the read request, the area data may be rapidly read from a rapidly accessible temporary storage unit as needed as far as the area data is stored in the temporary storage unit. Consequently, the information processing system according to the optional aspect of the present disclosure is capable of rapidly reading a bunch of area data requested by the read request.

Incidentally, in the map data storage unit, a bunch of area data may be stored in such a manner as to arrange the area data in order from the highest road rank or the lowest road rank. Further, when reading a bunch of area data not stored in the temporary-storage unit from the map data storage unit, the read control section may collectively read the area data included at least within an address range from a start address of area data within the bunch of area data that is of a non-lowest road rank, which is a road rank other than the lowest road rank, and located at the beginning of an address space to an end address of area data within the bunch of area data that is of a non-lowest road rank, which is a road rank other than the lowest road rank, and located at the end of the address space.

The frequency at which the area data is requested tends to be higher when the area data is of a high road rank than when the area data is of a low road rank. Therefore, when the area data of a high road rank is collectively read as described above, the area data that is not requested by the read request but is stored in the temporary storage unit may be effectively used in accordance with the user's traveling and with the progress of route searching and guidance processing. This makes it possible to decrease the number of reads from the map data storage unit and rapidly read a bunch of area data requested by the read request.

Further, when reading a bunch of area data not stored in the temporary_ storage unit from the map data storage unit, the read control section may collectively read the area data included within an address range from a start address of area data within the bunch of area data that is located at the beginning of the address space to an end address of area data within the bunch of area data that is located at the end of the address space.

Furthermore, in the map data storage unit, a bunch of area data may be arranged in order from the highest road rank to the lowest. In this instance, the read control section may collectively read from the map data storage unit a bunch of area data included within an address range from a start address of area data within the bunch of area data that is of the highest road rank and located at the beginning of the address space to an end address of area data within the bunch of area data that is of the lowest road rank and located at the end of the address space.

When the above-described configuration is employed, whole bunch of area data not stored in the temporary storage unit may be collectively read. Although it may be necessary to increase the storage capacity of the temporary storage unit, the above-described configuration makes it possible to decrease the number of reads from the map data storage unit and effectively reduce the read-related processing load and processing time.

The information processing system according to an optional aspect of the present disclosure may include a discard section. The discard section discards from the temporary storage unit a bunch of area data that is temporarily stored in the temporary storage unit and read at a frequency lower than a predetermined level. When the predetermined level is set to vary with the road rank, the discard section preferentially discards area data of a low road rank. The information processing system configured as described above makes it possible to effectively use the temporary storage unit having a limited storage capacity and temporarily store highly relevant area data in the temporary storage unit.

Moreover, when the properties of roads and the amount of area data are taken into consideration, the area data may be configured so that the area data of a high road rank represents a road network within a large zone while the area data of a low road rank represents a road network within a small zone. In other words, the above-mentioned layer data classified by road rank may be configured so that the layer data of a relatively low road rank includes the area data about relatively small zones.

The road ranks may be defined as two different grades (high and low road ranks), as three different grades (high, intermediate, and low road ranks), or as four or more different grades. When the road map data is prepared by storing the layer data classified by road rank as described above, it is easy, for instance, to perform a map update. Further, according to an optional aspect of the present disclosure, the use of the above method makes it possible to rapidly read the area data in compliance with the read request even when multi-layered road map data is used.

Further, the read control section may be configured to read individual area data in compliance with a read request generated from a process execution section. The process execution section executes at least one of a map display process of displaying a road map, a route search process of searching for a route to a destination, and a route guidance process of providing guidance on the route to the destination.

BRIEF DESCRIPTION OF DRAWINGS

The above and other objects, features, and advantages of the present disclosure will become more apparent from the following detailed description made with reference to the accompanying drawings. In the drawings.

EMBODIMENT FOR CARRYING OUT INVENTION

An embodiment of the present disclosure will now be described with reference to the accompanying drawings.

Figure 1:
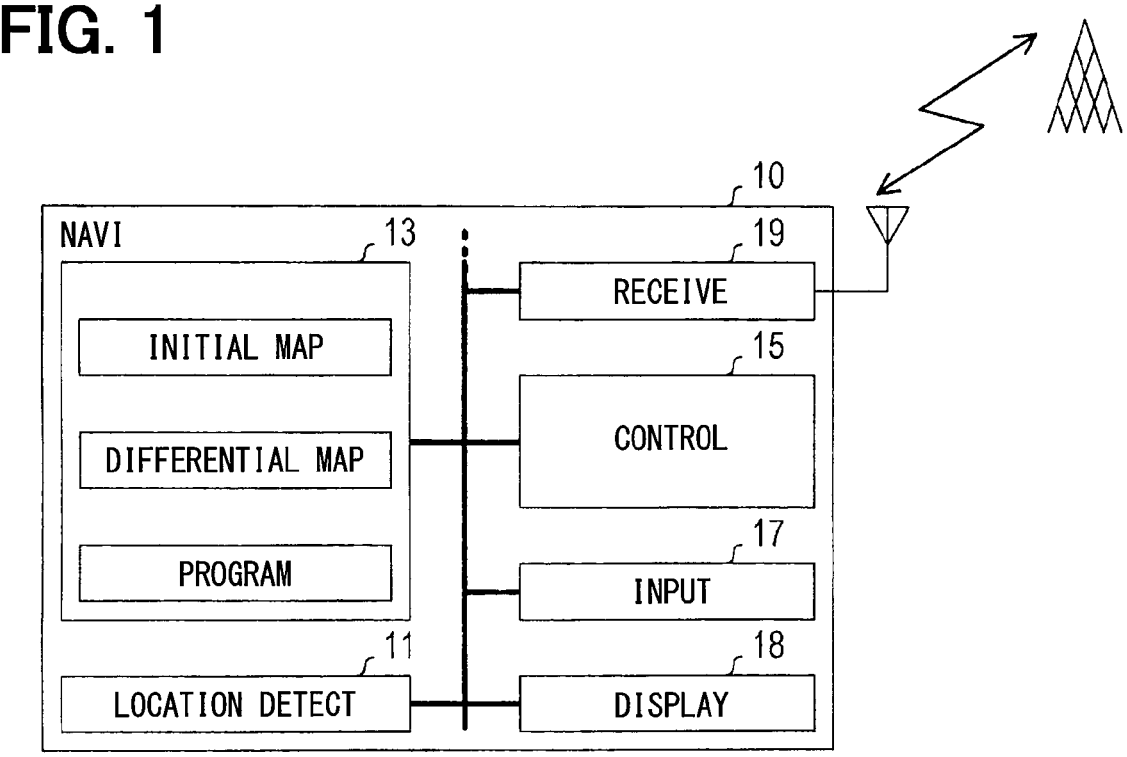
FIG. 1 is a block diagram illustrating the internal configuration of a navigation apparatus.

A navigation apparatus 10 according to the present embodiment is an example of an information processing system according to an embodiment of the present disclosure. The navigation apparatus 10 is of a vehicle-mounted type and used to execute a process by using road map data (hereinafter simply referred to as the "map data"). As shown in FIG. 1, the navigation apparatus 10 includes a location detection portion 11, a storage portion 13, a control portion 15, an input portion 17, a display portion 18, and a receiver portion 19.

The location detection portion 11 detects the current location of a vehicle in which the navigation apparatus 10 is mounted. The location detection portion 11 includes, for example, a well-known gyroscope, distance sensor, and GPS receiver.

The storage portion 13 includes, for example, a hard disk drive or a flash memory. The storage portion 13 stores not only initial map data but also differential map data as map data. The initial map data is stored prior to the shipment of the navigation apparatus 10. The differential map data is received from a broadcast station through the receiver portion 19. The differential map data is prepared on the basis of a road network indicated by the initial map data to represent a new road network in accordance with the difference from the road network indicated by the initial map data. In short, the differential map data represents road network changes from the initial map data. Difference information based on the differential map data included in a broadcast signal transmitted from the broadcast station is added to the differential map data stored in the storage portion 13. The storage portion 13 also stores programs used by the control portion 15 and various other data.

Figure 2:
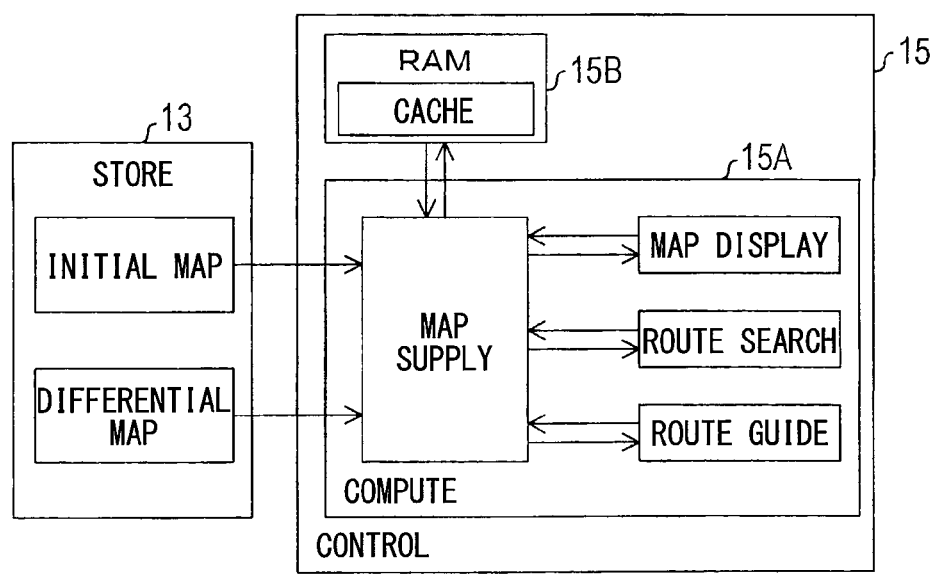
FIG. 2 is a block diagram illustrating an internal configuration of a control portion.

The control portion 15 is formed of a microcomputer. As shown in FIG. 2, the control portion 15 includes a computation portion 15A and a RAM 15B. The computation portion 15A executes various processes in accordance with the programs stored in the storage portion 13.

The computation portion 15A executes, for example, a map display process, a route search process, and a route guidance process in accordance with the programs. The map display process causes the screen of the display portion 18 to display, on a user-designated scale, the road map of an area around a current location detected by the location detection portion 11 or the road map of an area around a spot requested (designated) by a user through the input portion 17. The route search process searches for a route to a user-designated destination. The route guidance process provides guidance on the route to the destination in accordance with the current location by (i) an image display with the display portion 18 and (ii) an audio output.

Further, the computation portion 15A executes a map supply process (described in detail later) of accessing the initial map data and differential map data, reading data designated by a read request generated, for instance, from the map display process, route search process, or route guidance process, and supplying the read data to a read requester.

The input portion 17 includes a touch panel and various key switches. The touch panel is provided on the screen of the display portion 18. The key switches are provided around the touch panel. The input portion 17 functions as a user interface that accepts user operations relative to the navigation apparatus 10. The display portion 18 includes, for example, an LCD display and a speaker to display various images on the screen and generates an audio output. The receiver portion 19 is capable of receiving a digital broadcast signal that is distributed from a broadcast station to convey the differential map data.

The configurations of the initial map data and differential map data stored in the storage portion 13 will now be described. However, the initial map data and differential map data are written in the same data format. Therefore, attention will be hereinafter focused on the initial map data to describe the detailed configuration of map data.

Figure 3:
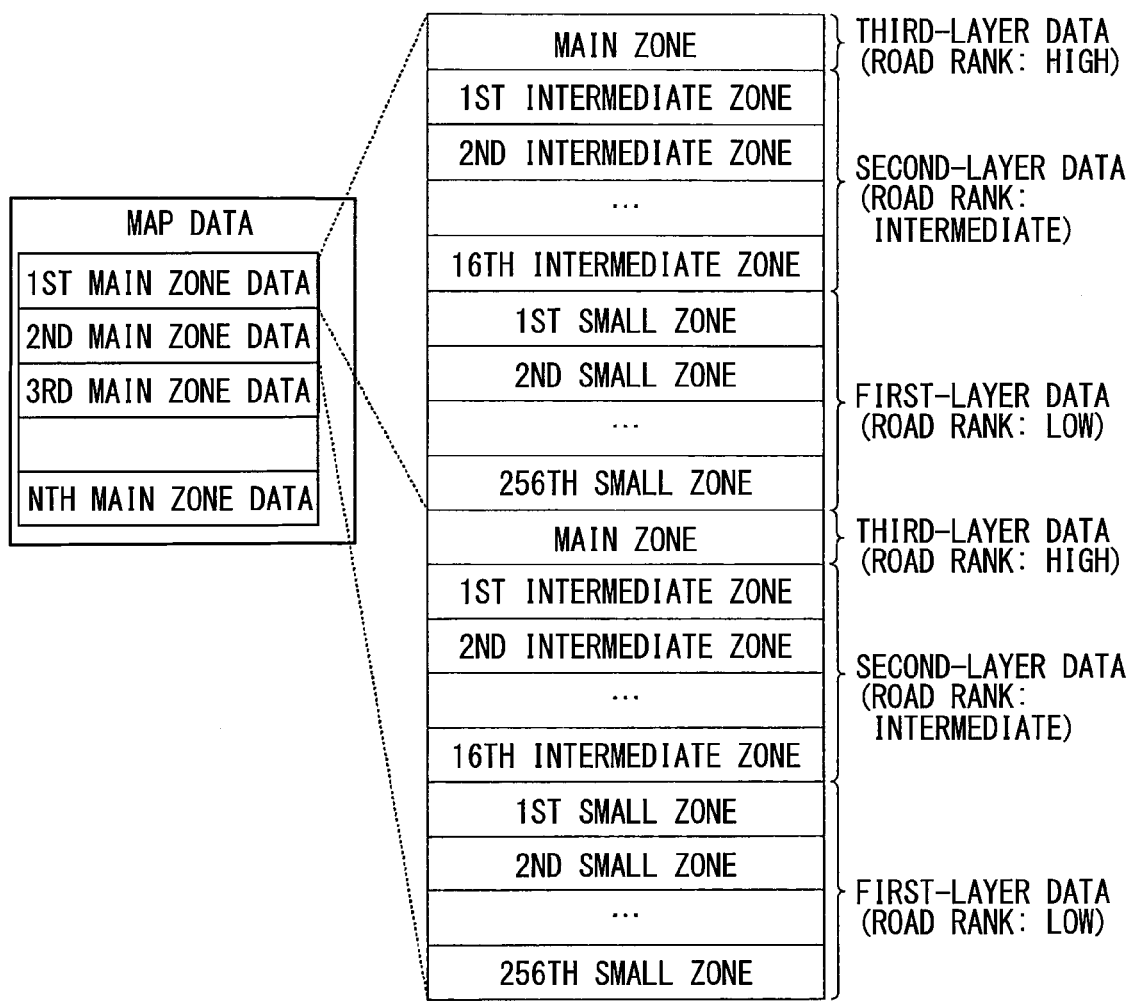
FIG. 3 is a diagram illustrating a configuration of map data stored in a storage portion.

As shown in FIG. 3, the initial map data includes map data about each of zones into which a mapped area is divided. The zones are hereinafter referred to as "main zones". Map data about each main zone that is included in the initial map data is referred to as the main zone data. A bunch of main zone data is configured as a bunch of data that is organized by arranging relevant main zone data in the order compliant with the geographical dispositions of the zones. Main zone data disposed at the Kth position within the arrangement is hereinafter referred to as the Kth main zone data.

The main zone data is configured as map data that hierarchically represents a road network in a relevant main zone in accordance with road ranking. More specifically, the main zone data includes third-layer data, second-layer data, and first-layer data. The third-layer data represents a road network of a high road rank within the relevant main zone. The second-layer data represents a road network of an intermediate road rank within the relevant main zone. The first-layer data represents a road network of a low road rank within the relevant main zone. Typical road types are, for example, superhighways, national roads, prefectural roads, local streets, and minor streets. Three different road ranks may be defined by classifying the typical road types into a road for long-distance traveling, a road for intermediate-distance traveling, and a road for short-distance traveling. For example, the superhighways and national roads may be defined as roads of a high road rank, the prefectural roads may be defined as roads of an intermediate road rank, and the local streets and minor streets may be defined as roads of a low road rank. However, a designer is at liberty to determine the road rank of each road type.

The main zone data is configured as a bunch of data in which the third-layer data, the second-layer data, and the first-layer data are arranged in the order named.

Figure 4:
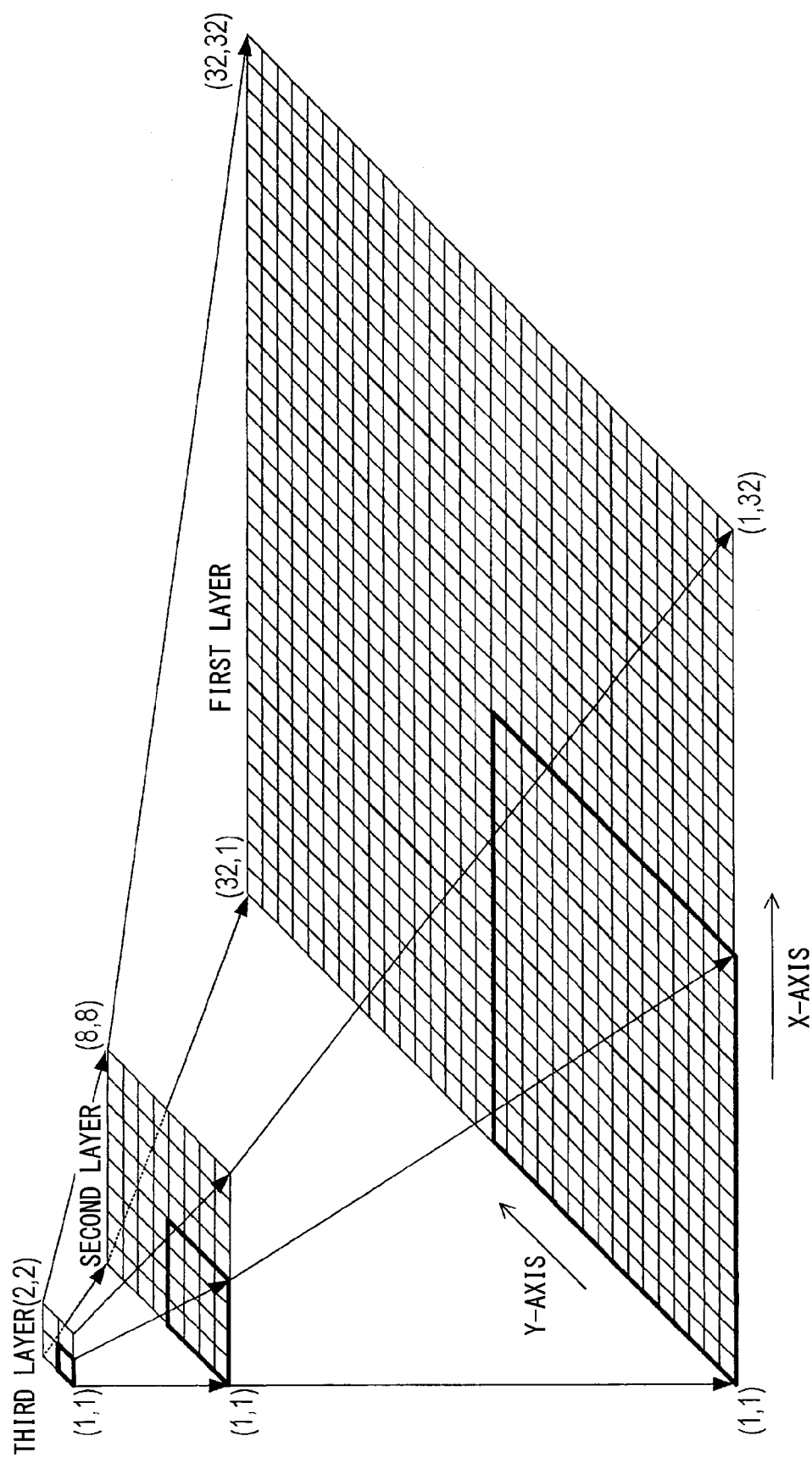
FIG. 4 is a diagram illustrating a relationship between zones in each layer.

The second-layer data is formed of area data about individual zones (hereinafter referred to as the "intermediate zones") into which a relevant main zone is divided. The area data about each intermediate zone is configured as map data that represents a road network of an intermediate road rank in a relevant intermediate zone. More specifically, in the present embodiment, the intermediate zones are defined by dividing the main zone by 16 (by 4 in each of the vertical and horizontal directions) as shown in FIG. 4. The main zone corresponds to a zone that is enclosed by a thick line in FIG. 4. The intermediate zone corresponds to each cell in the second layer shown in FIG. 4. Thus, the second-layer data is formed of sixteen area data (16 pieces of area data). A bunch of these area data (second-layer data) are configured as a bunch of data in which the area data about a relevant intermediate zone are arranged in the order compliant with the geographical dispositions of the intermediate zone. The area data about an intermediate zone that is disposed at the Kth position within the arrangement is hereinafter referred to as the Kth intermediate zone data.

The first-layer data is formed of area data about individual zones (hereinafter referred to as the "small zones") into which a relevant main zone is divided. The small zones are obtained by dividing the relevant main zone into zones of a smaller size than the size of the second-layer data. The area data about each small zone is configured as map data that represents a road network of a low road rank in a relevant small zone. More specifically, in the present embodiment, the small zones are defined by dividing the main zone by 256 (by 16 in each of the vertical and horizontal directions). The small zone corresponds to each cell in the first layer shown in FIG. 4. Thus, the first-layer data is formed of 256 area data (256 pieces of area data). A bunch of these area data (first-layer data) are configured as a bunch of data in which the area data about a relevant small zone are arranged in the order compliant with the geographical dispositions of the small zone. The area data about a small zone that is disposed at the Kth position within the arrangement is hereinafter referred to as the Kth small zone data. Further, the third-layer data may also be referred to as the third layer area data in connection with the "area data" in the first and second layers.

Figure 5:
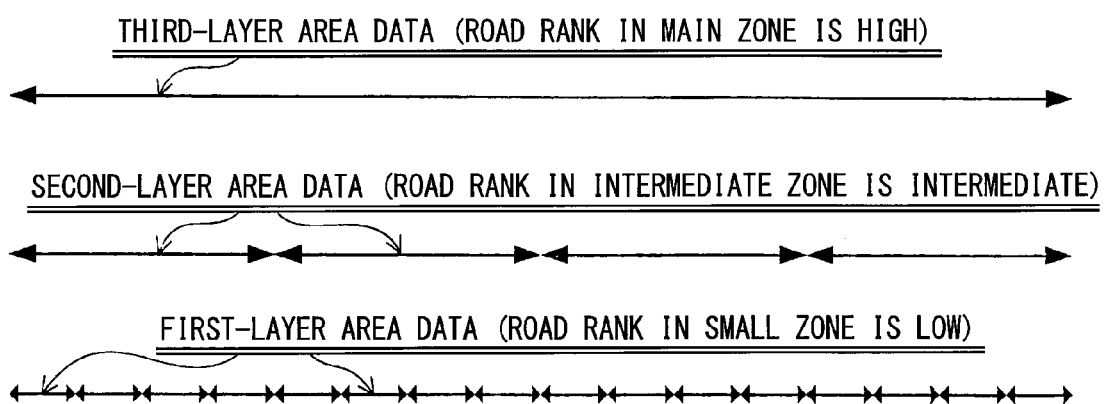
FIG. 5 is a diagram illustrating a relationship between area data in each layer.

In other words, the layer data (third-layer data, second-layer data, and first-layer data) in the present embodiment are configured so that the layer data of a relatively low road rank includes the area data about a relatively small zone as shown in FIG. 5. The main zone data is configured so that a bunch of area data having a zone size that varies from one road rank to another are arranged in the order compliant with the order of zone arrangement and in order from the highest road rank to the lowest.

Figure 6:
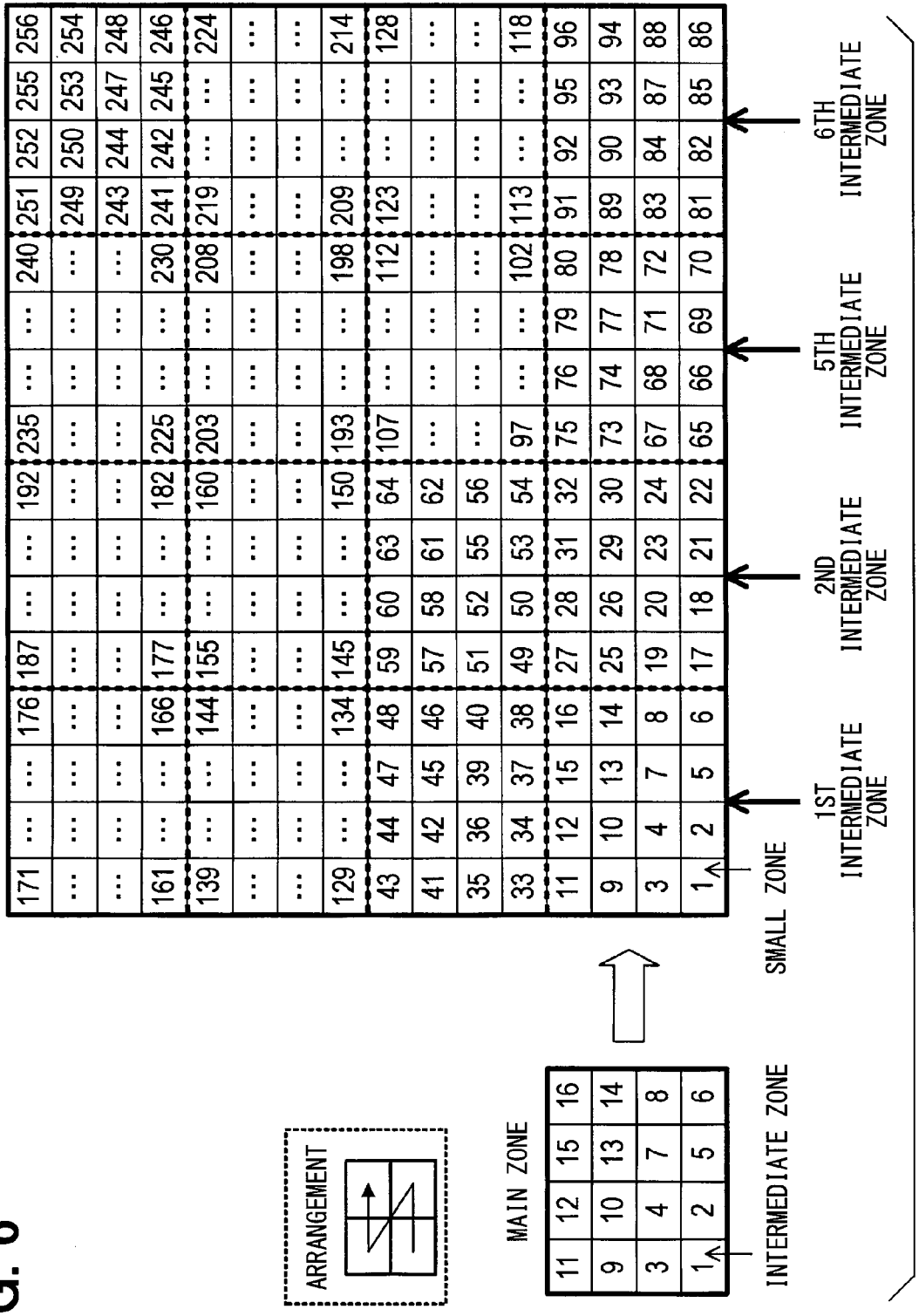
FIG. 6 is a diagram illustrating order of arrangement of area data within first- and second-layer data.

FIG. 6 shows the order of arrangement of area data (second-layer area data) included in the second-layer data and the order of arrangement of area data (first-layer area data) included in the first-layer data. In FIG. 6, each cell should be recognized as being indicative of geographical disposition relationship, and a numerical value in each cell should be recognized as being indicative of the order K of arrangement.

In other words, the area enclosed by a thick line at left of FIG. 6 corresponds to a main zone. Each cell in this area corresponds to an intermediate zone. A zone represented by a cell whose numerical value is K is the Kth intermediate zone in the second-layer data (this zone corresponds to the Kth intermediate zone data). Further, the area enclosed by a thick line (solid line) at right of FIG. 6 corresponds to a main zone. A zone represented by a cell whose numerical value is K is the Kth small zone in the first-layer data (this zone corresponds to the Kth small zone data).

As is obvious from FIG. 6, in each layer data, a bunch of area data are arranged in accordance with geographical dispositions so that the area data about adjacent zones are arranged in proximity to each other. Individual area data included in the main zone data are disposed at contiguous addresses in the storage portion 13 in the above-described order and stored through a driver (hardware driver or software driver) of the storage portion 13 so that they may be collectively read in accordance with a designated address range. Collectively reading of area data signifies that the area data within a designated address range are read by a single read command issued to the storage portion 13.

Figure 7:
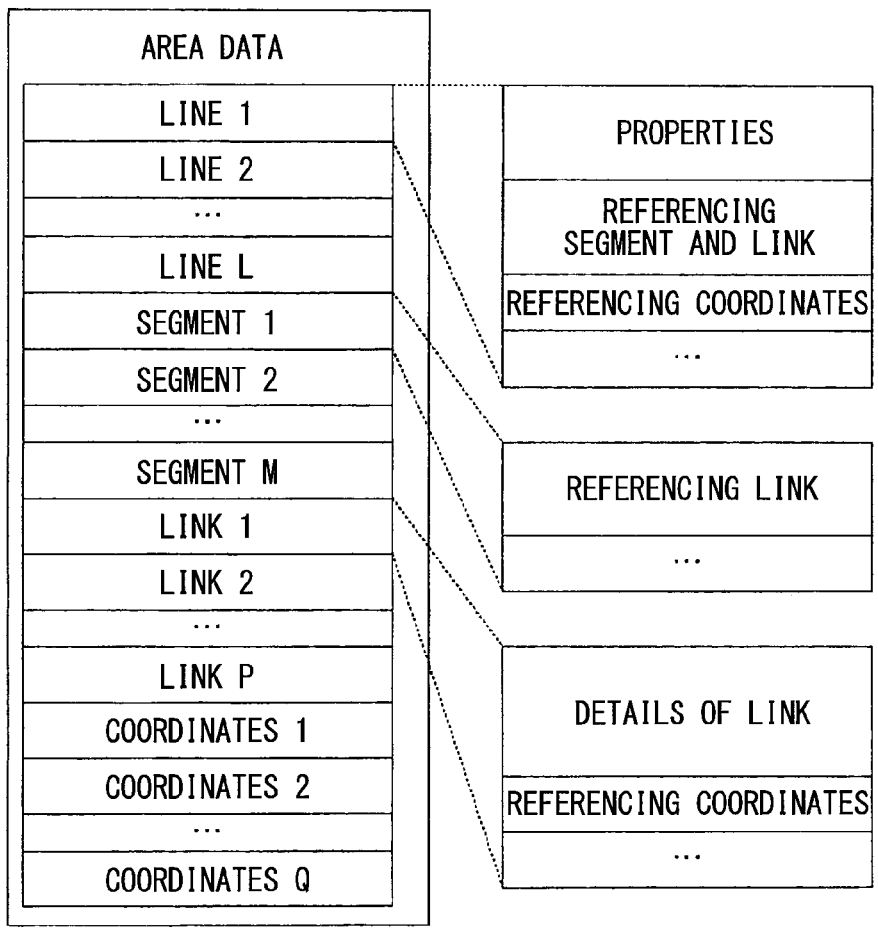
FIG. 7 is a diagram illustrating a detailed configuration of area data.
Figure 8:
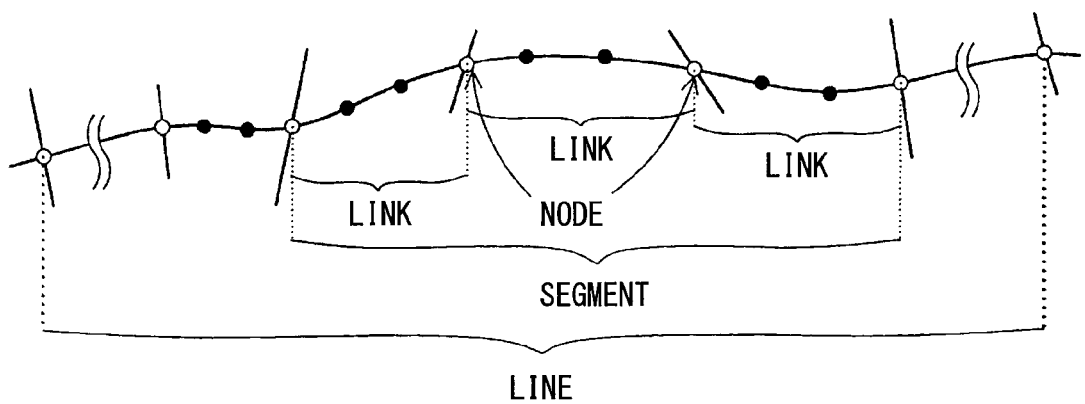
FIG. 8 is a diagram illustrating a relationship between links, segments, and lines.

The configuration of the area data will now be described in detail with reference to FIGS. 7 and 8. However, the area data configuration employed here is the same as the configuration described in previous applications (JP-2012-163909A, etc.) of the same applicant as that of the present disclosure. Therefore, the area data configuration will be briefly described below.

The area data indicates the connections of links to represent the connections between individual roads included in a road network having a road rank associated with a relevant zone. As shown in FIG. 7, the area data includes a link record of each link. The link record includes detailed information about a link, which indicates, for example, the length of the link and the connection to another link, and reference information relative to a coordinate record. A bunch of coordinate records contain information about individual links indicated by a bunch of link records and represent the coordinates of a node positioned at a link end point (the point of a connection to another link) and the coordinates of spots in the links. In other words, each coordinate record indicates the coordinates and type (node or coordinate retention point) of one of the spots. The reference information relative to a coordinate record, which is included in the link record, is used for referencing the inside of a link associated with the link record and a bunch of coordinate records indicative of the coordinates of an end point.

Further, the area data includes a segment record concerning links other than those of a low road rank. The segment record is provided for each segment that uses a link column delimited at least by intersections with the links other than those of a low road rank as one unit. Therefore, the segment record is not provided for area data of a low road rank. The segment record includes reference information relative to a link record concerning individual links included in the relevant segment.

Each segment (see FIG. 8) is used in place of a link to a major road that is represented by a layer higher than the lowest layer in conventional map data. In order to effectively cope, for instance, with changes in the scale of a map to be displayed, the conventional map data includes map data about individual layers such as layer data indicative of a detailed road network and layer data indicative of a major road network from which roads of a low road rank are excluded. On the other hand, the present embodiment provides layer data of each road rank without adopting the configuration of the conventional map data in which the information about major roads is redundantly included in a plurality of layers. Thus, the concept of segments is used to represent a link to a major road in a so-called high layer of the conventional map data in the form of referencing a link record.

Moreover, the area data includes a line record for each link column belonging to the same line. Here, the term "line" is a concept larger than the concept of segments. For example, the line is defined in a relevant zone by linearly connected link columns having the same road name and road number as a single string. Each line record includes property information about a line including information indicating whether the line is a toll road or a toll-free road, reference information relative to a segment record or link record, and reference information relative to a coordinate record. The reference information relative to a segment record or link record, which is included in a line record, is configured as information for referencing a segment record concerning each segment included in a relevant line when the link columns forming the relevant line have the concept of segments and configured as information for referencing a link record concerning each link included in the relevant line when the link columns forming the relevant line do not have the concept of segments. The reference information relative to a coordinate record, which is included in the line record, is configured as information for referencing a bunch of coordinate records indicative of coordinates in a line related to the line record and coordinates of an end point.

The present embodiment uses the above-described area data configuration. This makes it possible to achieve referencing by excluding information about link (segment) connections in accordance with the scale or the like without employing the map data structure of the conventional map data in which the information about major roads is redundantly included in a plurality of layers. However, the area data included in the differential map data is configured as information indicative of road changes in a relevant zone from the initial map data. For example, the area data included in the differential map data is configured so that a bunch of commands are written to indicate corrections to the initial map data (or a previous version of differential map data) and the locations of such corrections.

Figure 9:
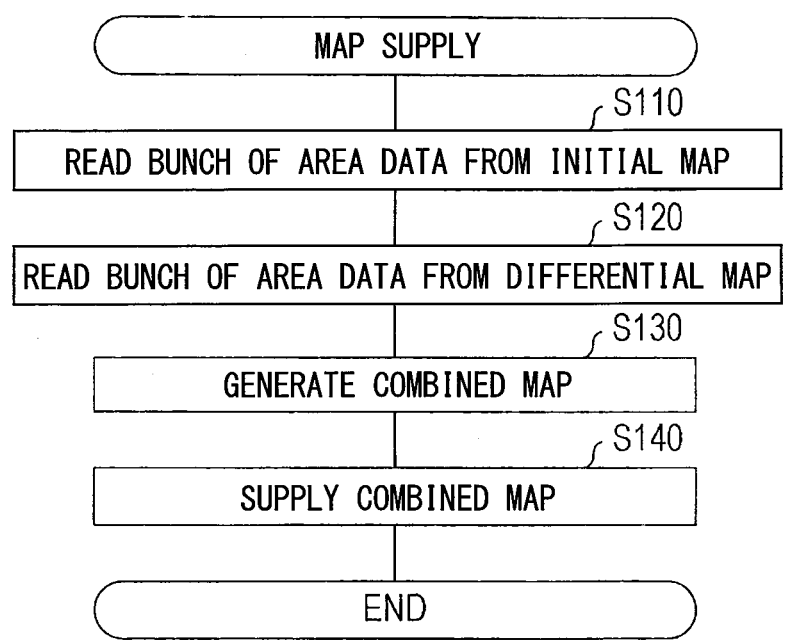
FIG. 9 is a flowchart illustrating a map supply process executed by a computation portion.

The details of the map supply process executed by the computation portion 15A will now be described with reference to FIG. 9. The computation portion 15A executes the map supply process upon receipt of a read request from another process (map display process, route search process, route guidance process, or the like).

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

At the beginning of the map supply process, the computation portion 15A accesses the initial map data and reads the area data about individual zones (hereinafter referred to as the "designated zones") designated as read targets by the read request. In this instance, a later-described read control process is executed to read a bunch of area data about the individual zones (S110). A bunch of area data about main zones, intermediate zones, small zones, or a combination of these zones are designated as the read targets depending on the read request. When the area data about main zones/intermediate zones/small zones is designated, the read control process is executed on the assumption that the area data about the third layer/second layer/first layer is requested.

Upon completion of the above process, the computation portion 15A accesses the differential map data and reads a bunch of area data about the same zones as in S110. In this instance, too, the later-described read control process may be executed (S120).

Next, the computation portion 15A merges the bunch of area data about the designated zones, which were read in S110 and S120, on an individual zone basis to generate combined map data about each zone (S130). More specifically, in S130, the area data read from the initial map data is combined with the area data about the same zone, which is read from the differential map data, in order to generate the combined map data, which is the area data in which the information about a new road network concerning the relevant zone is reflected. Next, the computation portion 15A supplies the generated combined map data about each zone to a read requester (S140) and then terminates the map supply process.

However, in S130, map data (hereinafter referred to as the "consolidated map data") obtained by combining the combined map data about individual layers (road ranks) in overlapping regions may be generated. Further, in S140, the consolidated map data, which is obtained by combining different layers, that is, obtained by consolidating the road networks of various road ranks, may be supplied to the read requester.

When the above-mentioned consolidated map data is to be generated, the read requester should use the read request to designate the zone size (main zone, intermediate zone, or small zone) for consolidated map data generation. Then, in S130, the consolidated map data should be generated in accordance with the zone size designated by the read request.

When, for instance, the size of a small zone is designated as the unit of generating the consolidated map data, the combined map data about a small zone (first layer), the combined map data about an intermediate zone (second layer) surrounding the small zone, and the combined map data about a main zone (third layer) surrounding the small zone may be combined to generate the consolidated map data about the small zone. This process may be performed for each small zone designated by the read request. Similarly, when the size of an intermediate zone is designated as the unit of generating the consolidated map data, the combined map data about an intermediate zone (second layer) and the combined map data about a main zone (third layer) surrounding the intermediate zone may be combined to generate the consolidated map data about the intermediate zone. This process may be performed for each intermediate zone designated by the read request.

Figure 10:
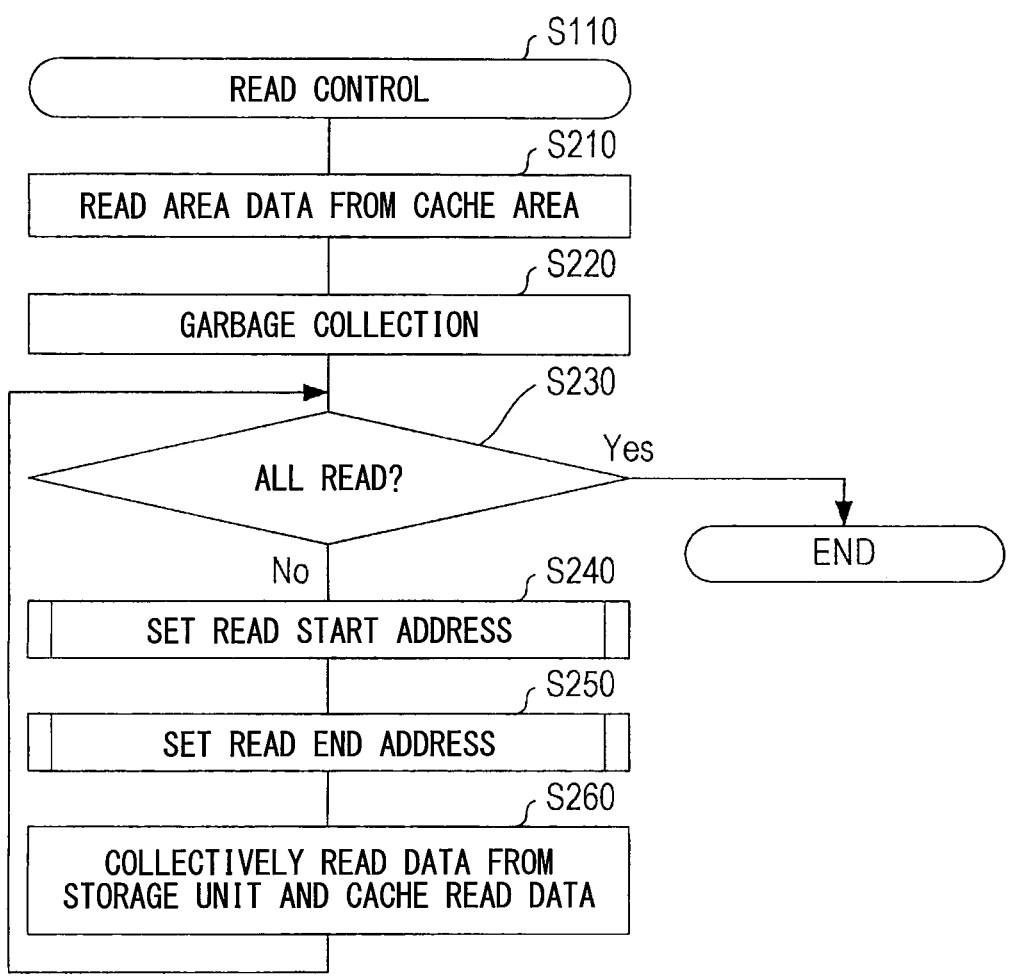
FIG. 10 is a flowchart illustrating a read control process executed by the computation portion.

The read control process executed in S110 and S120 by the computation portion 15A will now be described with reference to FIG. 10.

At the beginning of the read control process, the computation portion 15A accesses a cache area of the RAM 15B and reads a bunch of area data designated as a read target by a read request that is temporarily stored in the cache area of the RAM 15B (S210). The bunch of area data stored in the cache area corresponds to a bunch of area data that is read and cached by the storage portion 13 during previous read control processes.

After the above process, a garbage collection process is executed (S220) to discard (delete) a bunch of infrequently read area data from the cache area of the RAM 15B. For example, the garbage collection process in S220 may discard, from the cache area, a bunch of area data that were not read Z times or more, namely, in past Z or more S210(s) of the previous read control processes including the immediately previous read control process.

The variable Z may be arbitrarily defined by the designer. However, it may be set, for example, to be 1. When Z=1, the area data, which is not read in the immediately preceding S210, is discarded.

Alternatively, the variable Z may be variously defined for individual layers (road ranks). Area data of a high road rank is frequently read because it is required for the map display process no matter scale is employed. In the route search process, too, the area data of a high road rank is frequently required because a route search is often conducted before long-distance traveling. In other words, the area data of a relatively high road rank tends to be read more frequently than the area data of a relatively low road rank.

Therefore, when the variable Z is to be defined variously for the individual layers (road ranks), the value of the variable Z should be set to be relatively high for area data of a relatively high road rank so that area data of a relatively low road rank is preferentially discarded. Hence, highly demanded area data may be efficiently cached in the cache area having a small storage capacity. For example, the value of the variable Z may be 16 for area data in the third layer, 4 for area data in the second layer, and 1 for area data in the first layer.

After a bunch of area data read at a frequency lower than a predetermined frequency is discarded from the cache area of the RAM 15B during the above-described garbage collection process, the computation portion 15A determines whether or not all the area data designated by the read request are read (S230). S230, which is performed immediately after S220, determines whether or not all the read targets are read from the cache area of the RAM 15B. If, all the area data to be read are read (if the query in S230 is answered "YES"), the read control process comes to an end.

Figure 11:
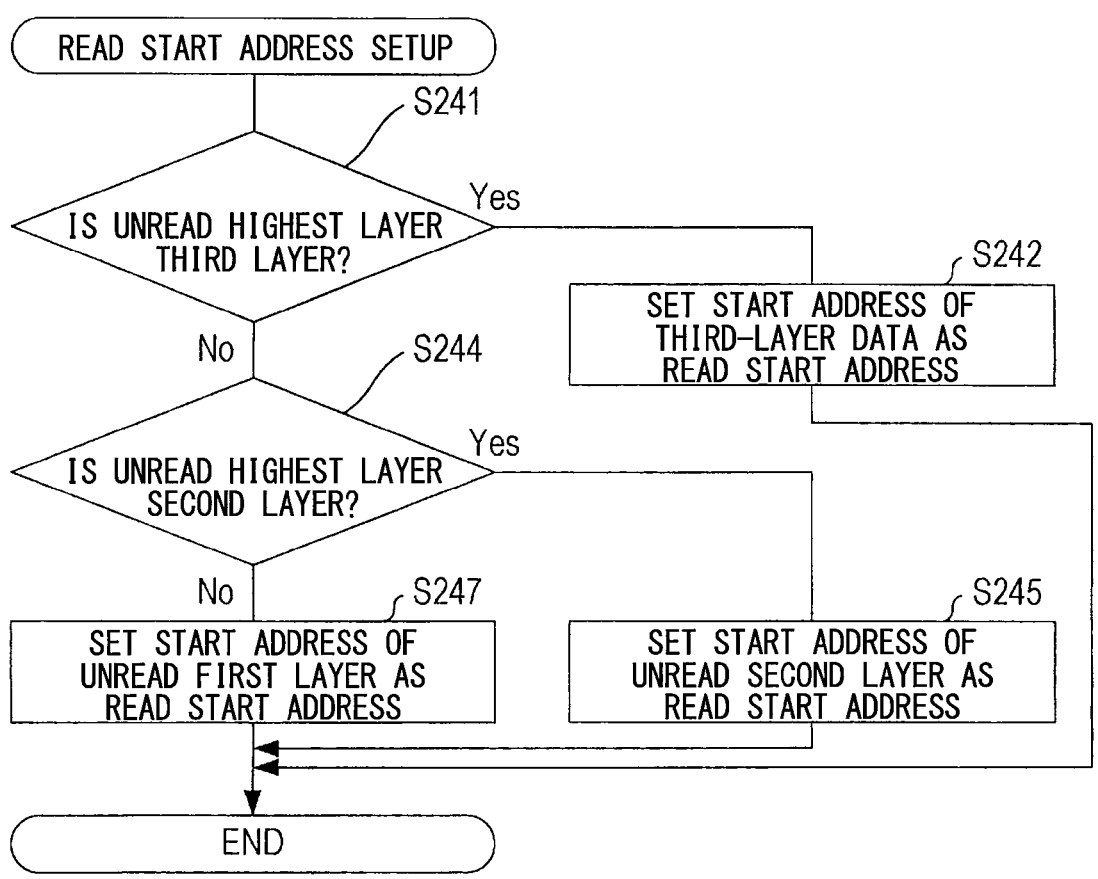
FIG. 11 is a flowchart illustrating a read start address setup process executed by the computation portion.

If, on the other hand, the query in S230 is answered "NO", the computation portion 15A executes a read start address setup process (S240) shown in FIG. 11. At the beginning of the read start address setup process, the computation portion 15A determines whether the area data in the highest layer (the area data of the highest road rank), which is included in the unread area data, is the area data in the third layer. In other words, S241 is performed to determine whether or not the area data in the third layer (third-layer data) is included in a bunch of area data that is designated by the read request and not read.

If it is determined that the area data in the third layer is included (if the query in S241 is answered "YES"), the computation portion 15A sets the start address of the area data in the third layer that is not read, namely, the start address of a region in the storage portion 13 where the area data in the third layer that is not read is stored, as a read start address (S242), and then terminates the read start address setup process. Here, it is assumed, however, that a plurality of third-layer area data (a plurality of pieces or sets of third-layer area data) are not designated as read targets by a single read request, and that second-layer and first-layer area data may be designated only when they are in the same main zone as the third-layer area data designated as a read target.

If, on the other hand, the query in S241 is answered "NO", the computation portion 15A proceeds to S244 and determines whether or not the unread highest-layer area data is the area data in the second layer. In other words, the computation portion 15A determines whether or not a bunch of area data that are included in the area data designated by the read request and not read excludes the area data in the third layer but includes the area data in the second layer.

If it is determined that the area data in the second layer is included (if the query in S244 is answered "YES"), S245 is performed so that the start address of the second-layer area data that is stored in the storage portion 13 and not read is set as the read start address. Upon completion of S245, the computation portion 15A terminates the read start address setup process. If a plurality of second-layer area data (a plurality of pieces or sets of second-layer area data) are not read, the start address of the second-layer area data stored at the beginning of the address space in the storage portion 13 is set as the read start address. Hence, the start address of second-layer area data that is included in the bunch of unread second-layer area data and is arranged at the first position of the second-layer data is set as the read start address.

If, on the other hand, it is determined in S244 that the area data in the second layer is not included, the computation portion 15A proceeds to S247, concludes that the unread highest-layer area data is the area data in the first layer, sets the start address of the bunch of the first-layer area data, which is not read and is stored at the beginning of the address space in the storage portion 13, as the read start address, and then terminates the read start address setup process. Hence, the start address of first-layer area data that is included in the bunch of unread first-layer area data and is arranged at the first position of the first-layer data is set as the read start address.

Figure 12:
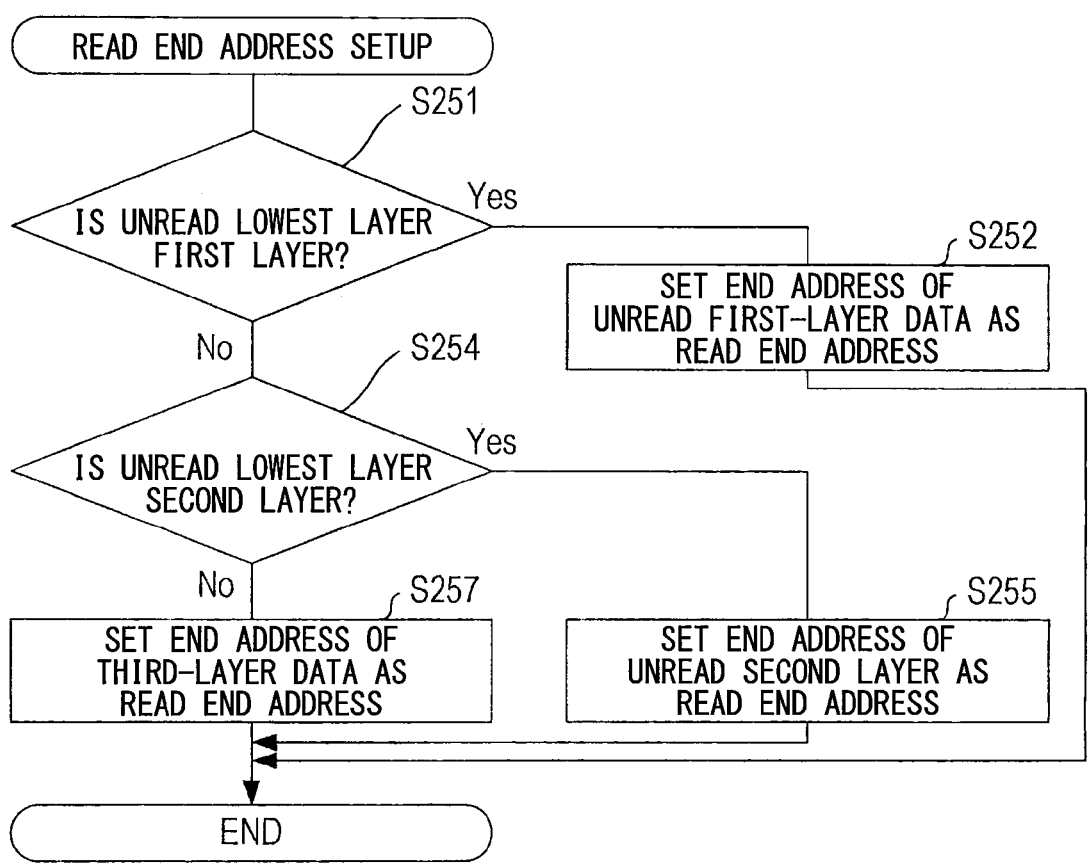
FIG. 12 is a flowchart illustrating a read end address setup process executed by the computation portion.

Upon completion of the read start address setup process, the computation portion 15A proceeds to execute a read end address setup process (250) shown in FIG. 12. At the beginning of the read end address setup process, the computation portion 15A determines whether or not the lowest-layer area data (the area data of the lowest road rank) included in the bunch of unread area data is the area data in the first layer. In other words, the computation portion 15A determines whether or not the area data in the first layer is included in the bunch of unread area data, which is included in the bunch of area data designated by the read request (S251). If it is determined that the area data in the first layer is included (if the query in S251 is answered "YES"), the end address of area data that is included in the bunch of unread first-layer area data and is stored at the end of the address space in the storage portion 13 is set as a read end address (S252). After setting the read end address as described above, the computation portion 15A terminates the read end address setup process. When the above-described setup process is performed, the end address of a region of the storage portion 13 in which the area data that is included in the bunch of unread first-layer area data and is arranged at the last position of the first-layer data is stored is set as the read end address.

If, on the other hand, the query in S251 is answered "NO", the computation portion 15A proceeds to S254 and determines whether or not the unread lowest-layer area data is the area data in the second layer. In other words, the computation portion 15A determines whether or not the area data in the second layer is included in the bunch of unread area data.

If it is determined that the area data in the second layer is included (if the query in S254 is answered "YES"), the end address of area data that is included in the bunch of unread second-layer area data and is stored at the end of a storage space in the storage portion 13 is set as the read end address (S255). After setting the read end address as described above, the computation portion 15A terminates the read end address setup process.

If, on the other hand, it is determined in S254 that the area data in the second layer is not included, the computation portion 15A proceeds to S257, concludes that the unread lowest-layer area data is the area data in the third layer, and sets the end address of the third-layer area data, which is not read, as the read end address. After setting the read end address as described above, the computation portion 15A terminates the read end address setup process.

Upon completion of the above process, the computation portion 15A proceeds to S260 (see FIG. 10), collectively reads area data included within an address range between the read start address and read end address, which are set as described above, registers the read area data in the cache area of the RAM 15B, and causes the RAM 15B to cache each of the read area data. More specifically, a read command, which designates the address range from the read start address to the read end address, is issued in S260 to the storage portion 13 so that the area data within the designated address range is collectively read from the storage portion 13.

As described above, when a bunch of area data that is designated by the read request and not cached are to be read from the storage portion 13 in the present embodiment, the designated bunch of area data, including area data that is positioned between the designated area data and not designated by the read request, are collectively read and cached into the RAM 15B. The RAM 15B is formed of hardware that is accessible at a higher speed than the storage portion 13. Therefore, the area data cached into the RAM 15B may be rapidly read while it is being cached.

Next, the computation portion 15A proceeds to S230 and determines again whether or not all the area data designated by the read request are read. If it is determined that all the area data designated by the read request are read, the computation portion 15A terminates the read control process. In the present embodiment, the read request is generated on an individual main zone basis as described above. Hence, in S230, which is performed after completion of S260, all the area data designated by the read request are read so that the query in S230 is answered "YES".

However, when it is configured such that a read request for designating a bunch of area data about a plurality of main zones is to be made acceptable, the address range should be designated in the above-described manner for each main zone to collectively read the third-, second-, and first-layer area data about each zone within a relevant main zone by repeatedly executing a processing loop of S230 to S260 for each main zone.

The read control process has been described above. A detailed description of a read operation will now be given with reference to FIGS. 13 to 18. The subsequent description will be given with coordinates (X, Y) defined for each zone. The X-Y coordinate system used for description purposes is shown in FIG. 4. A zone with coordinates (2, 1) is adjacent in X-direction to a zone with coordinates (1, 1). A zone with coordinates (2, 2) is adjacent in Y-direction to a zone with coordinates (2, 1). It should be noted that this X-Y coordinate system is provided for each main zone, each intermediate zone, and each small zone.

Figure 13:
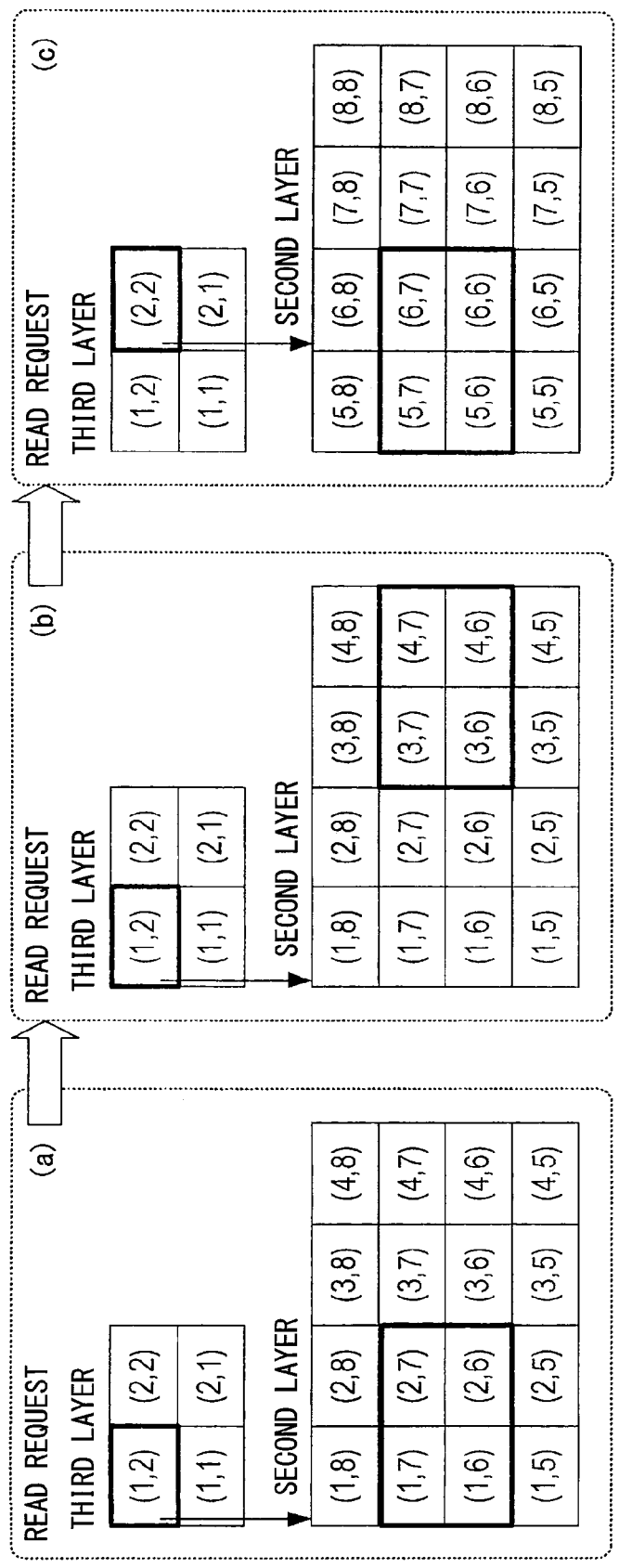
FIG. 13 is a set of diagrams illustrating read request changes in a first example.

As a first example, let us assume a case where a read request is issued in order to read area data about a main zone (1, 2) and area data about intermediate zones (1, 6) to (2, 7), which are enclosed by a thick line in FIG. 13 (a). The expression "(X1, Y1) to (X2, Y2)" represents a rectangular area that is defined by X1≤X≤X2 and Y1≤Y≤Y2. The expression "zones (X1, Y1) to (X2, Y2)" represents a bunch of zones within the above-mentioned rectangular area. Intermediate zones within the main zone (1, 2) are intermediate zones (1, 5) to (4, 8).

Figure 14:
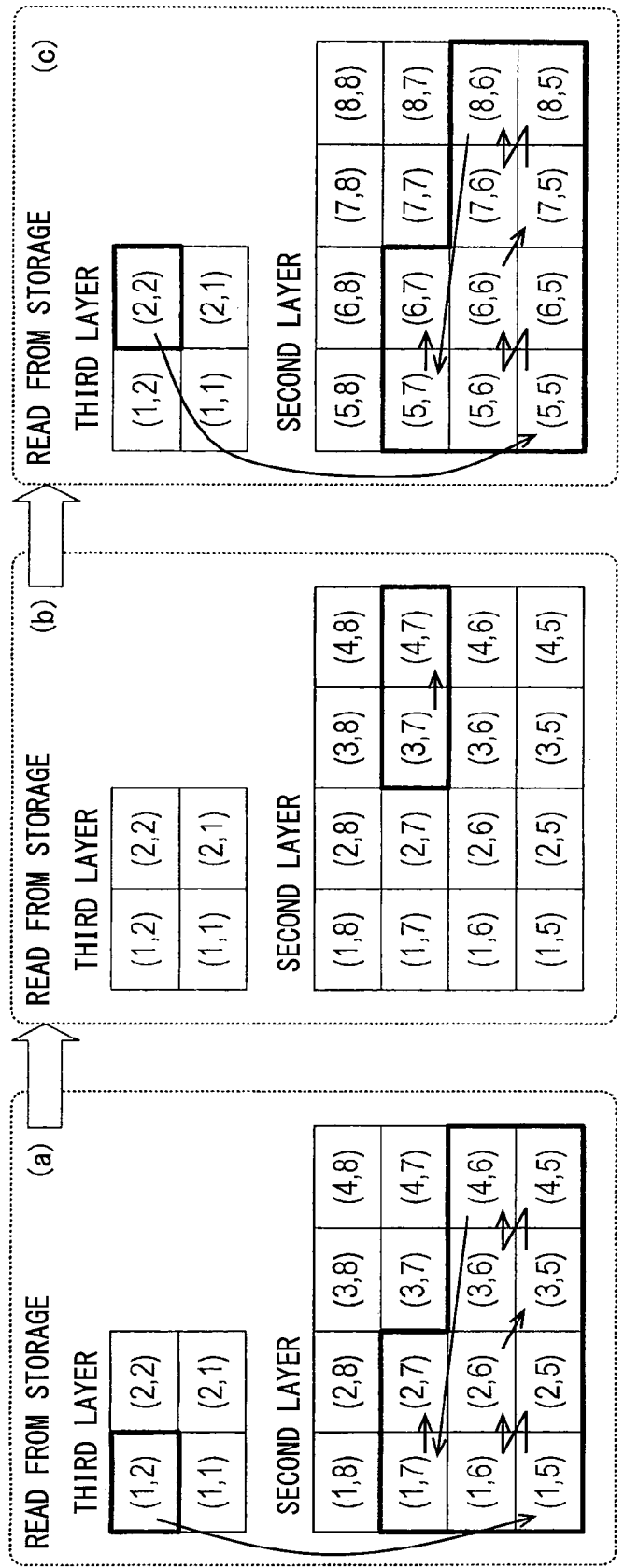
FIG. 14 is a set of diagrams illustrating a bunch of area data that are read from a storage portion in compliance with read requests in the first example.

When the read request according to the first example is issued while the cache area of the RAM 15B is empty, the third-layer data in main zone data about a main zone (1, 2) and the second-layer area data about intermediate zones (1, 5) to (4, 6) and intermediate zones (1, 7) to (2, 7) are collectively read from the storage portion 13 as indicated by a thick line in FIG. 14 (a) depending on the read control process. The area data about the intermediate zones (1, 5) to (4, 6) and intermediate zones (1, 7) to (2, 7) correspond to the first intermediate zone data to the tenth intermediate zone data, which are subsequent to the third-layer data in the main zone data about the main zone (1, 2). In other words, according to the first example, the third-layer data to the tenth intermediate zone data within the main zone data about the main zone (1, 2) are collectively read from the storage portion 13.

Let us also assume a case where a read request is issued subsequently to the above-described read request in order to read area data about the main zone (1, 2) and area data about intermediate zones (3, 6) to (4, 7), which are enclosed by a thick line in FIG. 13 (b). In this case, the third-layer area data about the main zone (1, 2) and the second-layer area data about the intermediate zones (3, 6) to (4, 6) exist in the cache area of the RAM 15B. Therefore, depending on the read control process, these area data are read from the cache area and the remaining area data, which are the area data about the intermediate zones (3, 7) to (4, 7) (enclosed by a thick line in FIG. 14 (b)), are collectively read from the storage portion 13. The area data about the intermediate zones (3, 7) to (4, 7) correspond to the thirteenth intermediate zone data to the fourteenth intermediate zone data within the main zone data about the main zone (1, 2). In other words, according to the present example, the thirteenth and fourteenth intermediate zone data within the main zone data about the main zone (1, 2) are collectively read from the storage portion 13.

Let us further assume a case where a read request is issued subsequently to the above-described read request in order to read area data about the main zone (2, 2) and area data about the intermediate zones (5, 6) to (6, 7), which are enclosed by a thick line in FIG. 13 (c). In this case, none of the read data designated by the read request exists in the cache area of the RAM 15B. Therefore, depending on the read control process, the third-layer data within the main zone data about the main zone (2, 2) and the second-layer area data about the intermediate zones (5, 5) to (8, 6) and intermediate zones (5, 7) to (6, 7) are collectively read from the storage portion 13 as indicated by a thick line in FIG. 14 (c). The area data about the intermediate zones (5, 5) to (8, 6) and intermediate zones (5, 7) to (6, 7) correspond to the first to tenth intermediate zone data, which are subsequent to the third-layer data within the main zone data about the main zone (2, 2).

Figure 15:
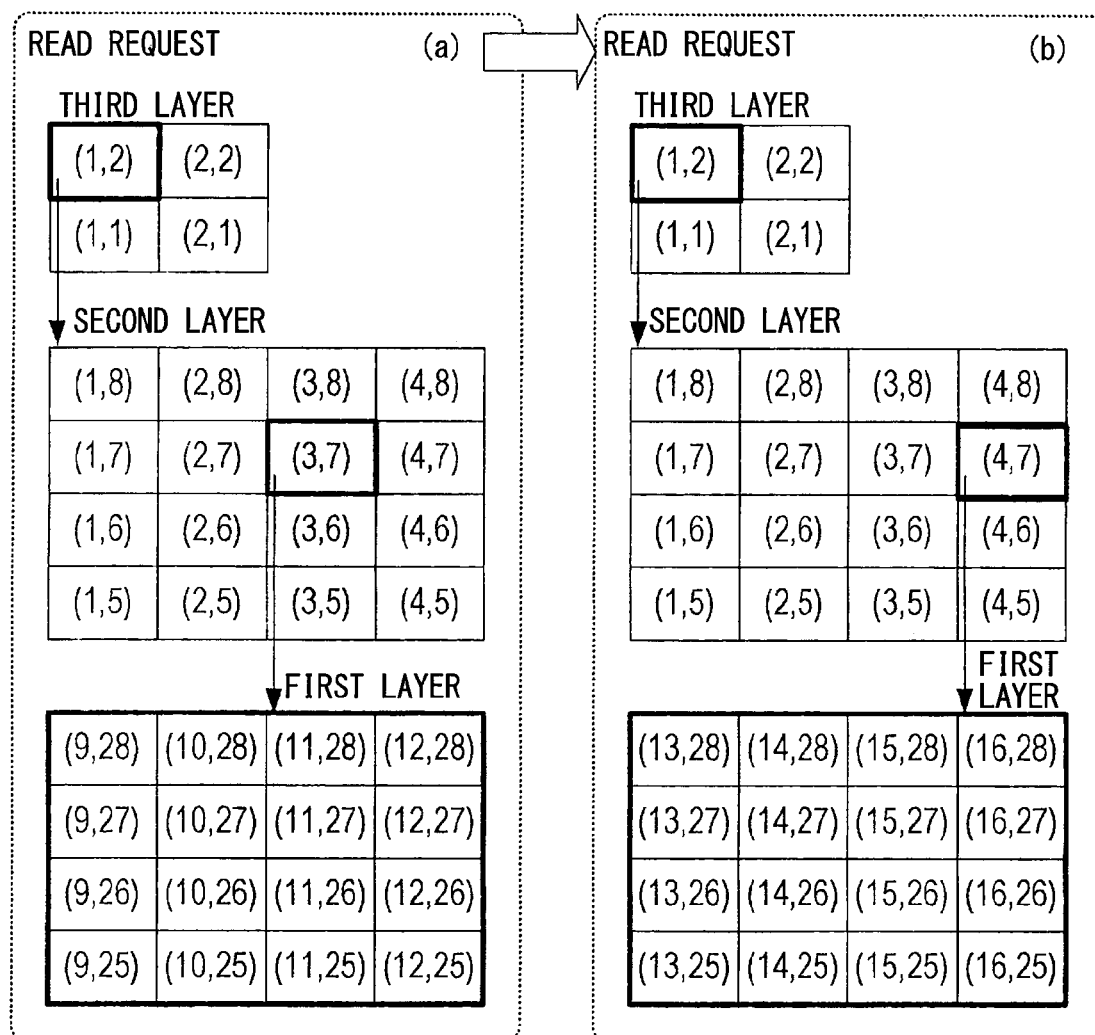
FIG. 15 is a set of diagrams illustrating read request changes in a second example.

Next, as a second example, let us assume a case where a read request is issued in order to read area data about the main zone (1, 2), area data about the intermediate zone (3, 7), and area data about small zones (9, 25) to (12, 28), which are enclosed by a thick line in FIG. 15 (a) while the cache area of the RAM 15B is empty. Small zones within the intermediate zone (3, 7) are the small zones (9, 25) to (12, 28).

Figure 16:
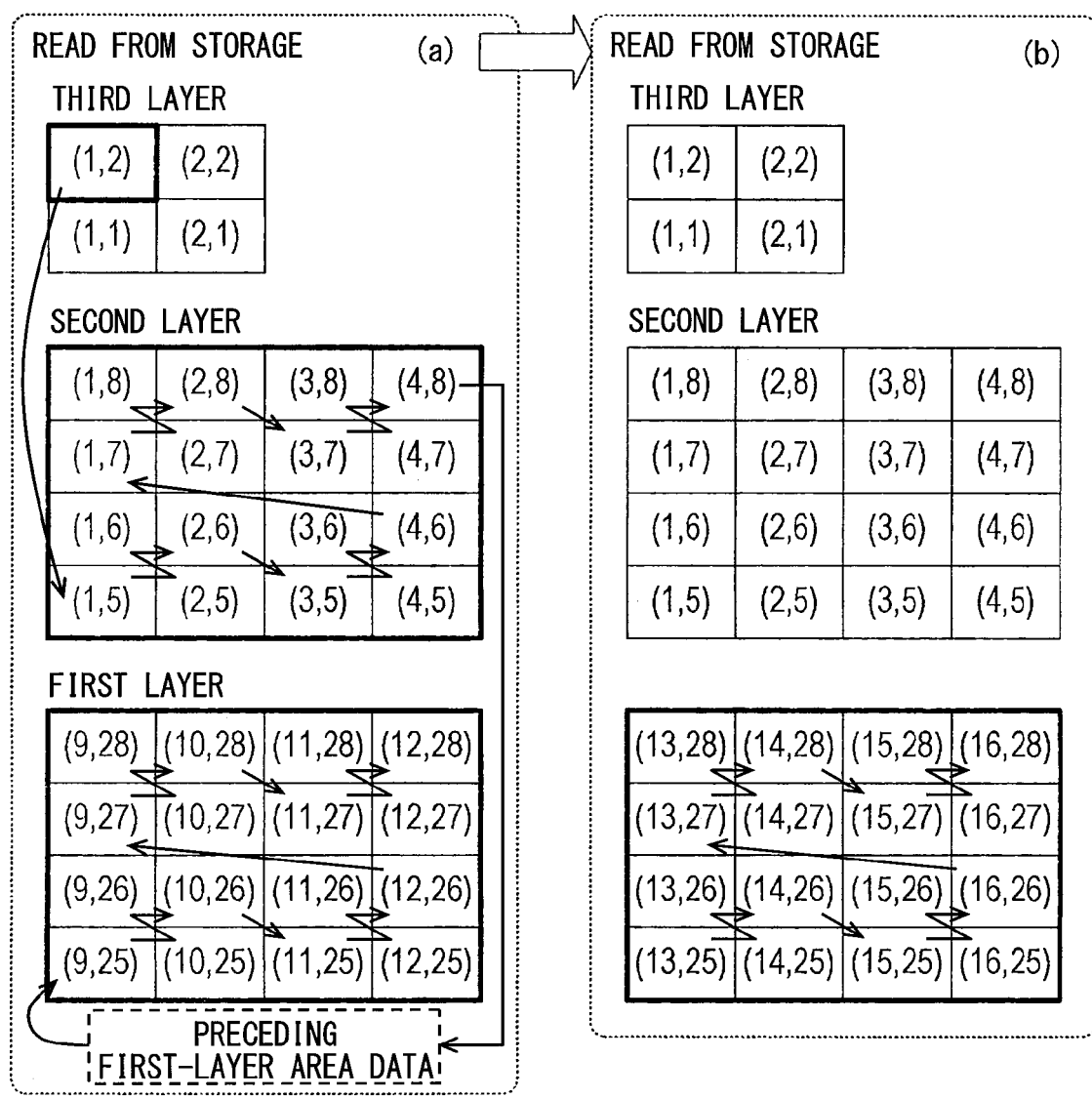
FIG. 16 is a set of diagrams illustrating a bunch of area data that are read from the storage portion in compliance with read requests in the second example.

In the above case, depending on the read control process, the third-layer data within the main zone data about the main zone (1, 2), the second-layer area data about the intermediate zones (1, 5) to (4, 8), the third-layer are data about the small zones (9, 25) to (12, 28), and the preceding first-layer area data disposed ahead of the area data about the small zone (9, 25) within the main zone data about the main zone (1, 2) are collectively read from the storage portion 13 as indicated by a thick line in FIG. 16 (a). As indicated in FIG. 6, the area data about the intermediate zones (1, 5) to (4, 8) correspond to the 1st to 16th intermediate zone data (all the intermediate zone data) subsequent to the third-layer data within the main zone data about the main zone (1, 2). The area data about the small zones (9, 25) to (12, 28) correspond to the 193rd to 208th small zone data within the main zone data about the main zone (1, 2). The preceding first-layer area data disposed ahead of the first-layer area data about the small zone (9, 25) correspond to the 1st to 192nd small zone data within the main zone data about the main zone (1, 2). In other words, according to the present example, the third-layer data to the 208th small zone data within the main zone data about the main zone (1, 2) are collectively read from the storage portion 13.

Let us also assume a case where a read request is issued subsequently to the above-described read request in order to read area data about the main zone (1, 2), area data about the intermediate zone (4, 7), and area data about the small zones (13, 25) to (16, 28), which are enclosed by a thick line in FIG. 15 (*b*). In this case, the third-layer area data about the main zone (1, 2) and the second-layer area data about the intermediate zone (4, 7) exist in the cache area of the RAM 15B. Therefore, depending on the read control process, these area data are read from the cache area and the remaining area data, which are the area data about the small zones (13, 25) to (16, 28) (enclosed by a thick line in FIG. 16 (*b*)), are collectively read from the storage portion 13. The area data about the small zones (13, 25) to (16, 28) correspond to the 209th to 224th small zone data within the main zone data about the main zone (1, 2). In other words, according to the present example, only the 209th to 224th small zone data within the main zone data about the main zone (1, 2) are read from the storage portion 13.

Figure 17:
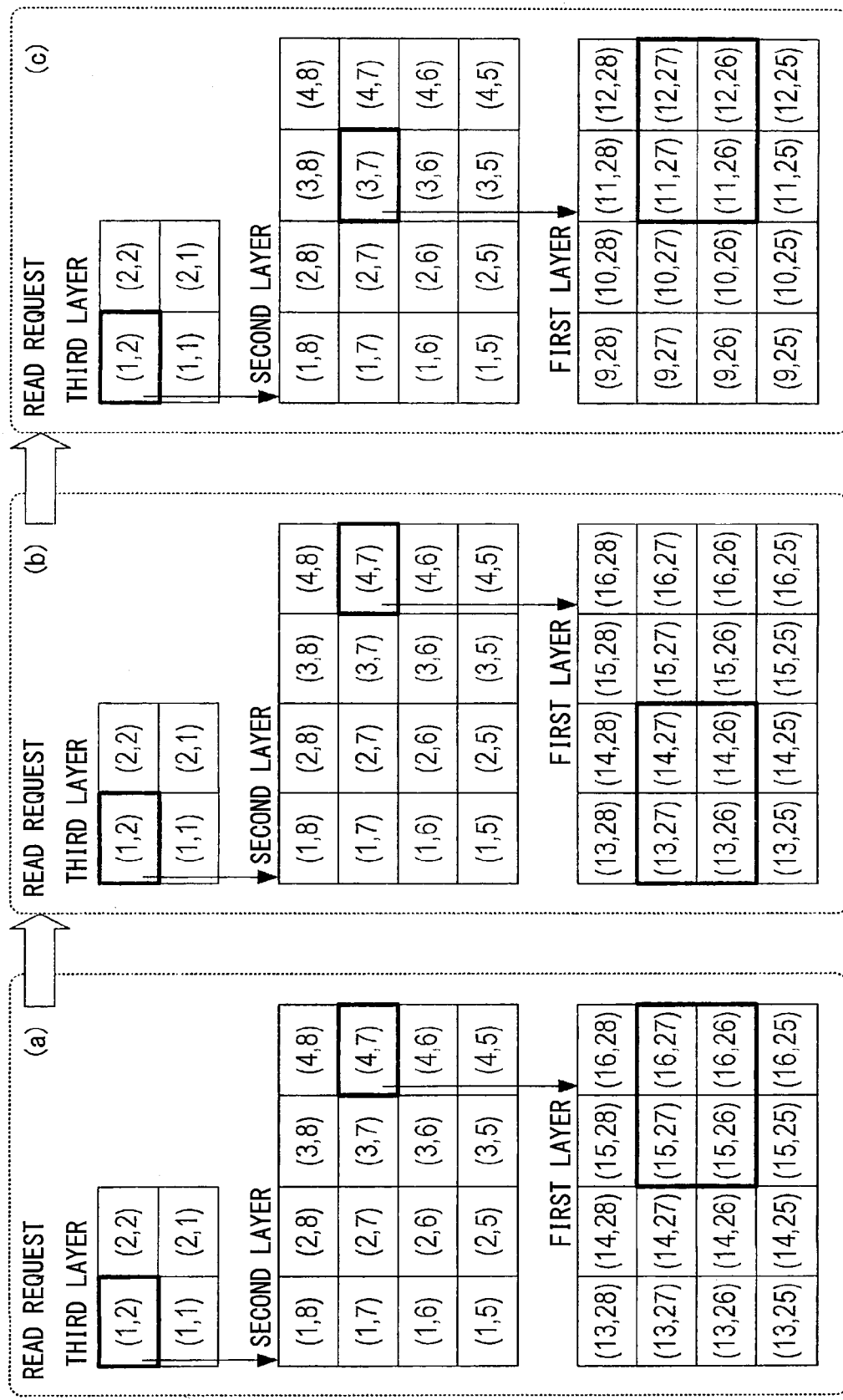
FIG. 17 is a set of diagrams illustrating read request changes in a third example.

Next, as a third example, let us assume a case where a read request is issued in order to read area data about the main zone (1, 2), area data about the intermediate zone (4, 7), and area data about the small zones (15, 26) to (16, 27), which are enclosed by a thick line in FIG. 17 (*a*) while the cache area of the RAM 15B is empty.

Figure 18:
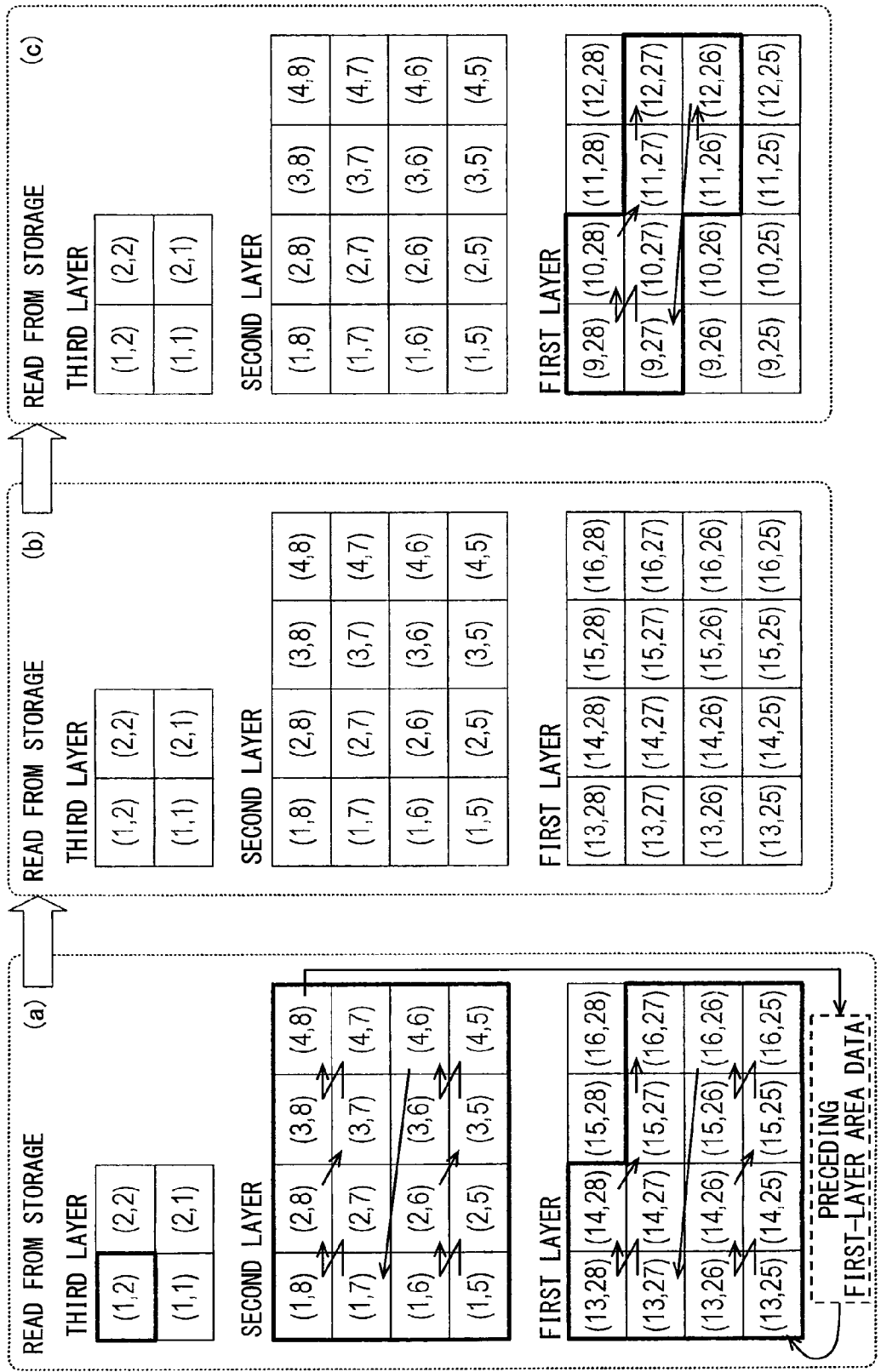
FIG. 18 is a set of diagrams illustrating a bunch of area data that are read from the storage portion in compliance with read requests in the third example.

In the above case, depending on the read control process, the third-layer data within the main zone data about the main zone (1, 2), the second-layer area data about the intermediate zones (1, 5) to (4, 8), the first-layer are data about the small zones (13, 25) to (16, 27) and the small zones (13, 28) to (14, 28), and the preceding first-layer area data disposed ahead of the area data about the small zone (13, 25) within the main zone data about the main zone (1, 2) are collectively read from the storage portion 13 as indicated by a thick line in FIG. 18 (*a*). The area data about the small zones (13, 25) to (16, 27) and the small zones (13, 28) to (14, 28) correspond to the 209th to 222nd small zone data within the main zone data about the main zone (1, 2).

Let us also assume a case where a read request is issued subsequently to the above-described read request in order to read area data about the main zone (1, 2), area data about the intermediate zone (4, 7), and area data about the small zones (13, 26) to (14, 27), which are enclosed by a thick line in FIG. 17 (*b*). In this case, the area data about the main zone (1, 2), the area data about the intermediate zone (4, 7), and the area data about the small zones (13, 26) to (14, 27) all exist in the cache area of the RAM 15B. Therefore, depending on the read control process, all the area data designated by the read request are read from the cache area.

Let us further assume a case where a read request is issued subsequently to the above-described read request in order to read area data about the main zone (1, 2), area data about the intermediate zone (3, 7), and area data about the small zones (11, 26) to (12, 27) while the variable Z for the second and third layers is set to be not smaller than 2 ($Z \geq 2$) and the variable Z for the first layer is set to be 1 ($Z=1$), which are enclosed by a thick line in FIG. 17(*c*). In this case, the third-layer area data about the main zone (1, 2) and the second-layer area data about the intermediate zone (3, 7) exist in the cache area of the RAM 15B. Therefore, depending on the read control process, these area data are read from the cache area and the area data about the small zones (11, 26) to (12, 27) and the small zones (9, 27) to (10, 28) (enclosed by a thick line in FIG. 18 (*c*)) are collectively read from the storage portion 13. The area data about the small zone (11, 26) corresponds to the 199th small zone data within the main zone data about the main zone (1, 2). The area data about the small zone (12, 27) corresponds to the 206th small zone data. In other words, according to the present example, only the 199th to 206th small zone data within the main zone data about the main zone (1, 2) are read from the storage portion 13.

The configuration of the navigation apparatus 10 according to the present embodiment has been described above. The navigation apparatus 10 reads area data designated by a read request from either the storage portion 13 or the cache area of the RAM 15B, and supplies the read area data to a read requester. More specifically, the navigation apparatus 10 reads a bunch of area data stored in the cache area of the rapidly accessible RAM 15B, which are included in a bunch of area data designated by the read request, and reads a remaining bunch of area data, which are designated by the read request but not stored in the cache area of the RAM 15B, from the storage portion 13, which takes a longer period of time to read than the RAM 15B.

Further, when the bunch of area data, which are designated by the read request but not stored in the cache area, are to be read from the storage portion 13, the designated bunch of area data are read together with area data that are not designated by the read request but are positioned between the designated area data within an address space. The bunch of area data read from the storage portion 13 are then temporarily stored in the cache area of the RAM 15B.

As described above, the navigation apparatus 10 according to the present embodiment reads a plurality of area data (a plurality of pieces or sets of area data), which are designated by the read request but positioned apart from each other within the address space, together with area data that are not designated by the read request but are positioned between the designated area data. Therefore, the number of reads of area data from the storage portion 13 is smaller than the number of reads of area data in the case when the area data about individual zones that are designated by the request are individually read. This makes it possible to reduce the read-related processing load and processing time and read required area data at high speed.

Further, the navigation apparatus 10 according to the present embodiment reads area data not designated by the read request. However, when a road map is viewed, the area data that are not designated by the read request but are positioned between the area data designated by the read request are geographically positioned in the road map near the area data designated by the read request. Therefore, as far as the area data not designated by the read request are cached, relevant data may be quickly read from the RAM 15B when a read request is issued from the map display process or route search process in accordance with the user's traveling and with the progress of route searching and guidance processing.

In the other words, the present embodiment makes it possible to implement a navigation apparatus that is capable of decreasing the number of reads from the storage portion 13 by the above-described method and rapidly reading required area data from the RAM 15B, and is excellent in processing performance.

In particular, the present embodiment collectively reads from the storage portion 13 a bunch of unread area data that are designated by the read request and included within an address range from a start address of area data that is of the highest road rank and located at the beginning of the address space to an end address of area data that is of the lowest road rank and located at the end of the address space. In this manner, the present embodiment collectively reads the whole bunch of area data that is designated by the read request but not stored in the cache area.

Consequently, the present embodiment makes it possible to further decrease the number of reads and perform a rapid, efficient read operation.

However, the present disclosure is not limited to the above-described embodiment, but may be variously modified. When, for instance, a bunch of area data that are designated by the read request but not stored in the cache area of the RAM 15B is to be read from the storage portion 13, an alternative is to divide the bunch of area data into a plurality of groups and collectively read the bunch of area data from each group, including area data that are not designated by the read request but are positioned between the bunch of area data designated by the read request.

For example, another alternative is to collectively read a bunch of third- and second-layer area data, which are of a higher road rank than first-layer area data, and separately read a bunch of the first-layer area data. In this instance, the read end address setup process (see FIG. 12) should be changed. More specifically, the read end address setup process should be changed so that the query in S251 is answered "YES" if the area data that are not read and are in the lowest layer (of the lowest road rank) are the first-layer area data and the unread area data are limited to the first-layer area data, and that the same query is answered "NO" in the other cases.

When the read end address setup process is changed as described above and a processing loop of S230 to S260 is executed for the first time in a case where first-layer area data and second- and higher-layer area data are included in a bunch of unread area data, the start address of area data that is included in a bunch of unread area data, of a non-lowest road rank, which is a road rank other than the lowest road rank (that is, the first layer), and located at the beginning of the address space is set as the read start address. Further, the end address of area data that is included in the bunch of unread area data, of a non-lowest road rank, which is a road rank other than the lowest road rank, and located at the end of the address space is set as the read end address. Thus, the area data included within the above address range are collectively read. The bunch of unread first-layer area data are read when the processing loop of S230 to S260 is executed for the second time.

There are a large number of first-layer area data. Therefore, as indicated in the second example described with reference to FIGS. 15 and 16, the storage location of intermediate zone area data and the storage location of small zone area data, which are designated by the read request, are considerably set apart from each other. Hence, when all the area data about individual zones designated by the read request are collectively read, a large number of area data not designated by the read request may be involved. When, in such a case, the area data are divided into a plurality of groups and read on an individual group basis, the storage capacity required of the cache area of the RAM 15B may be reduced although the number of reads increases.

Another example case is conceivable where a bunch of area data designated by the read request are to be divided into a plurality of groups and collectively read on an individual group basis, as follows. That is, each group of the plurality of groups may be configured to have both end address boundaries corresponding to two area data (two pieces of area data) designated by the read request. Such two area data serve as the both end address boundaries between which there are a specified number of area data not less than the predetermined number and there are existing multiple area data (multiple pieces of area data) not designated by the read request.

The above embodiment has been described with reference to a case where the present disclosure is applied to a vehicle-mounted navigation apparatus. However, it is obvious that the present disclosure is also applicable to smartphones and other electronic devices having a navigation function. Further, the above embodiment has been described on the assumption that the differential map data is supplied to the navigation apparatus by using a digital broadcast signal. Alternatively, however, the differential map data may be supplied to the navigation apparatus by using a cellular network or other wireless communication network or a USB memory, SD card, or other medium. In other words, the differential map data may be supplied to the navigation apparatus through various media.

The storage portion 13 corresponds to an example of a map data storage unit or map storage unit. The RAM 15B corresponds to an example of a temporary storage unit or temporary memory. The read control process corresponds to an example of a process implemented by the read control section. S220 of the read control process may be referred to as a discard section, device, or means. The map display process, the route search process, and the route guidance process may be referred to as a process execution section, device, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A navigation apparatus comprising:
   a map storage unit that stores specific road map data hierarchically describing a road network in a particular region in accordance with a plurality of road ranks including a highest road rank and a non-highest road rank that is other than the highest road rank,
   the specific road map data including a plurality of layer data, each layer data corresponding to each of the plurality of road ranks in the particular region, each layer data including one or more area data,
   the layer data of the non-highest road rank including at least more than one area data corresponding to more than one zone into which the particular region is divided,
   wherein area data is disposed in order of the road ranks within a contiguous address space;
   a temporary memory that is accessible at a higher speed than the map storage unit, the temporary memory being used to temporarily store area data read from the map storage unit; and
   a control portion having a processor and including
   a read requester configured to generate read request, and
   a read control section that reads area data requested by the read request from either the map storage unit or the temporary memory, the read control section supplying the read area data to the read requester, wherein:
the read control section reads from the temporary memory area data that is included in the area data requested by the read request and is stored in the temporary memory, whereas the read control section reads from the map storage unit area data that is included in the area data requested by the read request and is not stored in the temporary memory;
the read control section collectively reads a subject area data on basis of one or more groups when reading from the map storage unit the area data that is included in the area data requested by the read request and is not stored in the temporary memory,
the subject area data containing
the area data requested by the read request and not stored in the temporary memory, and, further,
area data that is not requested by the read request but is positioned in the address space between the area data requested by the read request and is not stored in the temporary memory;
the read control section temporarily stores in the temporary memory the subject area data read from the map storage unit; and
the read requester further configured to run at least one of
(i) a map display displaying a road map using a display portion,
(ii) a route search retrieving a route to a destination using a position detection portion detecting a current location, or
(iii) a route guidance providing guidance on the route from the current position to the destination using the display portion and audio output,
based on the area data in the temporary memory stored by the read control section in compliance with the generated read request.

2. The navigation apparatus according to claim 1, wherein:
the road ranks include a lowest road rank that is included in the non-highest road rank;
area data is stored in the map data storage unit to be arranged in order from either the highest road rank or the lowest road rank; and
when reading the area data not stored in the temporary storage unit from the map data storage unit, the read control section collectively reads at least area data that is of a non-lowest road rank other than the lowest road rank and included within an address range in the address space from a start address to an end address,
the start address being positioned at beginning of area data corresponding to the non-lowest road rank within the subject area data,
the end address being positioned at ending of area data corresponding to the non-lowest road rank within the subject area data.

3. The navigation apparatus according to claim 1, wherein:
the road ranks include a lowest road rank that is included in the non-highest road rank;
area data is stored in the map data storage unit to be arranged in order from either the highest road rank or the lowest road rank; and
when reading the area data not stored in the temporary storage unit from the map data storage unit, the read control section collectively reads area data included within an address range in the address space from a start address to an end address,
the start address being positioned at beginning of area data within the subject area data,
the end address being positioned at ending of area data within the subject area data.

4. The navigation apparatus according to claim 1, wherein:
the road ranks include a lowest road rank that is included in the non-highest road rank;
area data is stored in the map data storage unit to be arranged in order from the highest road rank to the lowest road rank; and
when reading the area data not stored in the temporary storage unit from the map data storage unit, the read control section collectively reads area data included within an address range in the address space from a start address to an end address,
the start address being positioned at beginning of area data of the layer data corresponding to the highest road rank within the subject area data,
the end address being positioned at ending of area data of the layer data corresponding to the lowest road rank within the subject area data.

5. The navigation apparatus according to claim 1, further comprising:
a discard section that discards from the temporary storage unit area data that is temporarily stored in the temporary storage unit and is read at a frequency lower than a predetermined level,
wherein the discard section preferentially discards area data corresponding to a lower road rank by setting the predetermined level to vary with each of the road ranks.

6. The navigation apparatus according to claim 1, wherein the layer data corresponding to a lower road rank includes area data corresponding to a smaller zone.

7. The navigation apparatus according to claim 1, wherein the specific road map data include the layer data of the road ranks that are defined as more than two different grades.

8. A navigation apparatus having specific road map data hierarchically describing a road network in a particular region in accordance with a plurality of road ranks including a highest road rank and a non-highest road rank that is other than the highest road rank,
the specific road map data including a plurality of layer data, each layer data corresponding to each of the plurality of road ranks in the particular region, each layer data including one or more area data,
the layer data of the non-highest road rank including at least more than one area data corresponding to more than one zone into which the particular region is divided,
wherein area data is disposed in order of the road ranks within a contiguous address space,
the navigation apparatus comprising:
a map storage unit that stores the specific road map data:
a temporary memory that is accessible at a higher speed than the map storage unit, the temporary memory being used to temporarily store area data read from the map storage unit; and
an electronic control unit including
a read requester configured to generate a read request corresponding to a single read command, and
a read control section that reads area data requested by the read request from either the map storage unit or the temporary memory, the read control section supplying the read area data to the read requester;
wherein:
the read control section reads from the temporary memory area data that are included in the area data requested by the read request and are stored in the temporary memory, whereas the read control section reads from the map storage unit area data that are included in the area data requested by the read request and are not stored in the temporary memory;

the read control section collectively reads a subject area data when reading from the map storage unit the data area that is included in the area data requested by the read request and is not stored in the temporary memory, the collectively read subject area data corresponding to contiguous addresses in the address space by containing first area data requested by the read request and not stored in the temporary memory, and, further, second area data that is not requested by the read request but are positioned in the address space between the first area data if the first area data corresponds to separate addresses that are not contiguous in the address space;

the read control section temporarily stores in the temporary memory the subject area data read from the map storage unit; and the read requester further configured to run at least one of (i) a map display displaying a road map using a display portion, (ii) a route search retrieving a route to a destination using a position detection portion detecting a current location, or (iii) a route guidance providing guidance on the route from the current position to the destination using the display portion and audio output, based on the area data in the temporary memory stored by the read control section in compliance with the generated read request.

9. The navigation apparatus according to claim 8, wherein:

the road ranks include a lowest road rank that is included in the non-highest road rank;

area data is stored in the map data storage unit to be arranged in order from either the highest road rank or the lowest road rank; and when reading the area data not stored in the temporary storage unit from the map data storage unit, the read control section collectively reads at least area data that is of a non-lowest road rank other than the lowest road rank and included within an address range in the address space from a start address to an end address, the start address being positioned at beginning of area data corresponding to the non-lowest road rank within the subject area data, the end address being positioned at ending of area data corresponding to the non-lowest road rank within the subject area data.

10. The navigation apparatus according to claim 8, wherein:

the road ranks include a lowest road rank that is included in the non-highest road rank;

area data is stored in the map data storage unit to be arranged in order from either the highest road rank or the lowest road rank; and when reading the area data not stored in the temporary storage unit from the map data storage unit, the read control section collectively reads area data included within an address range in the address space from a start address to an end address, the start address being positioned at beginning of area data within the subject area data, the end address being positioned at ending of area data within the subject data.

11. The navigation apparatus according to claim 8, wherein:

the road ranks include a lowest road rank that is included in the non-highest road rank;

area data is stored in the map data storage unit to be arranged in order from the highest road rank to the lowest road rank; and when reading the area data not stored in the temporary storage unit from the map data storage unit, the read control section collectively reads area data included within an address range in the address space from a start address to an end address, the start address being positioned at beginning of area data of the layer data corresponding to the highest road rank within the subject area data, the end address being positioned at ending of area data of the layer data corresponding to the lowest road rank within the subject area data.

12. The navigation apparatus according to claim 8, further comprising:

a discard section that discards from the temporary storage unit area data that is temporarily stored in the temporary storage unit and is read at a frequency lower than a predetermined level, wherein the discard section preferentially discards area data corresponding to a lower road rank by setting the predetermined level to vary with each of the road ranks.

13. The navigation apparatus according to claim 8, wherein the layer data corresponding to a lower road rank includes area data corresponding to a smaller zone.

14. The navigation apparatus according to claim 8, wherein the specific road map data include the layer data of the road ranks that are defined as more than two different grades.

15. A method executed by a computer in a navigation apparatus having a map storage unit storing specific road map data and a temporary memory accessible at a higher speed than the map storage unit, the specific road map data hierarchically describing a road network in a particular region in accordance with a plurality of road ranks including a highest road rank and a non-highest road rank that is other than the highest road rank, the specific road map data including a plurality of layer data, each layer data corresponding to each of the plurality of road ranks in the particular region, each layer data including one or more area data, the layer data of the non-highest road rank including at least more than one area data corresponding to more than one zone into which the particular region is divided, wherein area data is disposed in order of the road ranks within a contiguous address space, the method comprising:

generating from a read requester a single read command that requests area data;

reading, upon receiving the single read command, collectively subject area data from the map storage unit, the collectively read subject area data corresponding to contiguous addresses in the address space in the specific road map data by containing (i) first area data that is requested by the read command and not stored presently in the temporary memory, and, further, (ii) second area data that is not requested by the read command but are positioned in the address space between the first area data if the first area data corresponds to separate addresses that are not contiguous in the address space;

storing temporarily the subject area data read from the map storage unit into the temporary memory; and supplying the area data from the temporary memory to the read requester in compliance with the generated read command, causing the read requester to run at least one of
- (i) a map display displaying a road map using a display portion,
- (ii) a route search retrieving a route to a destination using a position detection portion detecting a current location, or
- (iii) a route guidance providing guidance on the route from the current position to the destination using the display portion and audio output, based on the area data supplied from the temporary memory in compliance with the generated read command.

\* \* \* \* \*